(12) United States Patent
Tomita

(10) Patent No.: US 10,917,172 B2
(45) Date of Patent: Feb. 9, 2021

(54) PLUGGABLE OPTICAL MODULE, OPTICAL COMMUNICATION SYSTEM, AND CONTROL METHOD OF PLUGGABLE OPTICAL MODULE

(71) Applicant: NEC Corporation, Tokyo (JP)

(72) Inventor: Isao Tomita, Tokyo (JP)

(73) Assignee: NEC Corporation, Tokyo (JP)

(*) Notice: Subject to any disclaimer, the term of this patent is extended or adjusted under 35 U.S.C. 154(b) by 0 days.

(21) Appl. No.: 16/627,617

(22) PCT Filed: May 25, 2018

(86) PCT No.: PCT/JP2018/020173
§ 371 (c)(1),
(2) Date: Dec. 30, 2019

(87) PCT Pub. No.: WO2019/012818
PCT Pub. Date: Jan. 17, 2019

(65) Prior Publication Data
US 2020/0145101 A1    May 7, 2020

(30) Foreign Application Priority Data
Jul. 14, 2017   (JP) .................. 2017-138042

(51) Int. Cl.
*H04B 10/00* (2013.01)
*H04B 10/079* (2013.01)
(Continued)

(52) U.S. Cl.
CPC . *H04B 10/07955* (2013.01); *H04B 10/25891* (2020.05); *H04B 10/548* (2013.01);
(Continued)

(58) Field of Classification Search
USPC .......................................................... 398/137
See application file for complete search history.

(56) References Cited

U.S. PATENT DOCUMENTS 4,460,249 A * 7/1984 Vincent ................. G02F 1/0123
  359/276
5,780,843 A * 7/1998 Cliche ....................... G01J 3/10
  250/205

(Continued)

FOREIGN PATENT DOCUMENTS

JP  2004-147323 A  5/2004
JP  2005-110266 A  4/2005
(Continued)

OTHER PUBLICATIONS

International Search Report dated Aug. 21, 2018, in the corresponding PCT International Application.

*Primary Examiner* — Agustin Bello
(74) *Attorney, Agent, or Firm* — Finnegan, Henderson, Farabow, Garrett & Dunner, L.L.P.

(57) ABSTRACT

A light source outputs a light. A branching unit branches the light output from the light source into a first branched light and a local oscillation light. A modulator modulates the first branched light to output an optical signal. A receiver causes the local oscillation light to interfere with an optical signal to receive the optical signal. An EDFA amplifies the optical signal output from the modulator. An excitation light source outputs an excitation light exciting the EDFA to the EDFA. An optical attenuator attenuates optical power of the optical signal amplified by the EDFA. A control unit controls attenuation of the optical signal in the optical attenuator. The control unit adjusts the attenuation of the optical signal and adjusts an output of the excitation light from the excitation light source.

20 Claims, 18 Drawing Sheets

(51) Int. Cl.
*H04B 10/61* (2013.01)
*H04B 10/564* (2013.01)
*H04B 10/548* (2013.01)
*H04B 10/25* (2013.01)
*G02F 1/21* (2006.01)
*G02F 1/225* (2006.01)

(52) U.S. Cl.
CPC ........... *H04B 10/564* (2013.01); *H04B 10/61* (2013.01); *G02F 1/225* (2013.01); *G02F 2001/212* (2013.01)

(56) References Cited

U.S. PATENT DOCUMENTS

| | | | | |
|---|---|---|---|---|
| 5,801,860 A * | | 9/1998 | Yoneyama | H04J 14/0221 398/197 |
| 5,917,637 A * | | 6/1999 | Ishikawa | G02F 1/0123 398/197 |
| 5,966,229 A * | | 10/1999 | Dodley | H04B 10/1121 398/106 |
| 6,046,838 A * | | 4/2000 | Kou | G02F 1/0516 359/239 |
| 6,111,681 A * | | 8/2000 | Mizrahi | G02B 6/02204 372/32 |
| 6,134,253 A * | | 10/2000 | Munks | G02B 5/20 372/23 |
| 6,163,555 A * | | 12/2000 | Siddiqui | H01S 5/0687 372/102 |
| 6,539,038 B1 * | | 3/2003 | Wilkerson, Jr. | G02F 1/0123 372/25 |
| 6,553,042 B2 * | | 4/2003 | Shio | H01S 3/13 372/23 |
| 6,583,910 B1 * | | 6/2003 | Satoh | H04B 10/07955 359/239 |
| 6,590,686 B1 * | | 7/2003 | Sekiya | H04B 10/503 398/182 |
| 6,652,158 B2 * | | 11/2003 | Bartur | G02B 6/4202 385/88 |
| 6,735,395 B1 * | | 5/2004 | Bai | H04B 10/504 372/31 |
| 6,738,584 B1 * | | 5/2004 | Tsuda | H04B 10/11 385/123 |
| 6,757,499 B1 * | | 6/2004 | Aoki | H04B 10/504 372/32 |
| 6,807,203 B2 * | | 10/2004 | Adams | G01J 9/00 372/28 |
| 6,839,518 B1 * | | 1/2005 | Minamimoto | H04B 10/077 398/160 |
| 6,842,587 B1 * | | 1/2005 | McGhan | H04B 10/503 398/183 |
| 7,006,769 B1 * | | 2/2006 | Kawasaki | G02F 1/0121 398/147 |
| 7,092,638 B2 * | | 8/2006 | Funami | H04J 14/0221 399/140 |
| 7,133,610 B1 * | | 11/2006 | Shimura | H04B 10/50575 398/15 |
| 7,139,491 B2 * | | 11/2006 | Katagiri | H04B 10/85 398/195 |
| 7,269,356 B2 * | | 9/2007 | Winzer | H04B 10/60 398/135 |
| 7,376,348 B2 * | | 5/2008 | Hasuo | H04B 10/032 398/15 |
| 7,379,672 B2 * | | 5/2008 | Wang | H04B 10/25751 356/451 |
| 7,522,846 B1 * | | 4/2009 | Lewis | H04B 10/07955 398/195 |
| 7,593,647 B2 * | | 9/2009 | Lee | H04B 10/572 398/182 |
| 7,634,201 B2 * | | 12/2009 | Maleki | G02B 6/29341 356/484 |
| 7,720,392 B2 * | | 5/2010 | Nakashima | H04B 10/50572 398/198 |
| 7,801,450 B2 * | | 9/2010 | Abe | H04B 10/50572 398/193 |
| 7,936,999 B1 * | | 5/2011 | Hawryluck | H04B 10/60 398/206 |
| 7,962,044 B2 * | | 6/2011 | McCallion | G02B 6/4201 398/192 |
| 8,190,033 B2 * | | 5/2012 | Tu | H01S 5/0687 398/196 |
| 8,218,974 B2 * | | 7/2012 | Hattori | H04B 10/85 398/195 |
| 8,340,525 B2 * | | 12/2012 | Bai | H04B 10/506 398/95 |
| 8,548,333 B2 * | | 10/2013 | Nagarajan | H04B 10/40 398/138 |
| 8,565,616 B2 * | | 10/2013 | Tanaka | H04B 10/50575 398/184 |
| 8,588,622 B2 * | | 11/2013 | Yasuda | H04B 10/5057 398/197 |
| 8,660,437 B1 * | | 2/2014 | Blauvelt | H04B 10/506 398/196 |
| 8,787,768 B2 * | | 7/2014 | Klotz | H04B 10/073 398/159 |
| 8,855,484 B2 * | | 10/2014 | Tsai | H04B 10/40 398/25 |
| 8,971,362 B2 * | | 3/2015 | Smith | H01S 5/0683 372/29.021 |
| 9,014,566 B2 * | | 4/2015 | Gottwald | H04B 10/40 398/138 |
| 9,143,236 B1 * | | 9/2015 | Bartur | H04B 10/071 |
| 9,203,518 B2 * | | 12/2015 | Ishii | H04B 10/505 |
| 9,654,219 B2 * | | 5/2017 | Li | H04B 10/616 |
| 9,735,888 B2 * | | 8/2017 | Fludger | H04B 10/5161 |
| 2001/0009469 A1 * | | 7/2001 | Shimizu | G02F 1/0327 398/197 |
| 2002/0171889 A1 * | | 11/2002 | Takeuchi | H04J 14/0221 398/34 |
| 2004/0131366 A1 * | | 7/2004 | Tsushima | H04B 10/58 398/197 |
| 2005/0008369 A1 * | | 1/2005 | Winzer | H04J 14/0206 398/83 |
| 2005/0041253 A1 * | | 2/2005 | Pearson | H04B 10/63 356/484 |
| 2005/0201759 A1 * | | 9/2005 | Wang | H04B 10/25751 398/183 |
| 2005/0201761 A1 * | | 9/2005 | Bartur | H04B 10/071 398/197 |
| 2008/0107428 A1 * | | 5/2008 | Abe | H04B 10/572 398/187 |
| 2009/0003843 A1 * | | 1/2009 | Oomori | H01S 5/0622 398/197 |
| 2009/0268901 A1 * | | 10/2009 | Lodewyck | H04L 9/0852 380/41 |
| 2010/0232805 A1 * | | 9/2010 | Cai | H04B 10/61 398/158 |
| 2011/0243556 A1 * | | 10/2011 | Nagarajan | H04B 10/40 398/43 |
| 2011/0299849 A1 * | | 12/2011 | Klotz | H04B 10/073 398/26 |
| 2012/0093502 A1 * | | 4/2012 | Gottwald | H04J 14/02 398/27 |
| 2012/0170092 A1 * | | 7/2012 | Rohde | H04B 10/60 359/196.1 |
| 2012/0230672 A1 * | | 9/2012 | Gottwald | H04B 10/60 398/7 |
| 2013/0058653 A1 * | | 3/2013 | Gottwald | H04J 14/0249 398/58 |
| 2013/0208335 A1 * | | 8/2013 | Gottwald | H04B 10/6165 359/279 |
| 2014/0193152 A1 * | | 7/2014 | Zhou | H04J 14/02 398/72 |
| 2015/0155952 A1 * | | 6/2015 | Lach | H04J 14/021 398/201 |
| 2015/0188639 A1 * | | 7/2015 | Akashi | H04B 10/50575 398/197 |
| 2016/0036530 A1 * | | 2/2016 | Yamamoto | H04B 10/03 398/1 |

(56) References Cited

U.S. PATENT DOCUMENTS

| | | | | |
|---|---|---|---|---|
| 2016/0146869 A1* | 5/2016 | Marsland, Jr. | ............ | G01J 1/44 |
| | | | | 324/76.77 |
| 2016/0261346 A1* | 9/2016 | Li | ........................... | H04L 5/143 |
| 2017/0111109 A1* | 4/2017 | Yamamoto | ........... | H04B 10/564 |
| 2017/0117969 A1* | 4/2017 | Fludger | .............. | H04B 10/6164 |
| 2018/0156974 A1* | 6/2018 | Minota | .................. | H04B 10/61 |

FOREIGN PATENT DOCUMENTS

| | | |
|---|---|---|
| JP | 2006-166387 A | 6/2006 |
| JP | 2013-179557 A | 9/2013 |
| JP | 2016-82590 A | 5/2016 |
| WO | WO 2014/141685 A1 | 9/2014 |
| WO | WO 2016/203683 A1 | 12/2016 |
| WO | WO 2017/056350 A1 | 4/2017 |

\* cited by examiner

| OPTICAL SIGNAL OPTICAL POWER | OPTICAL ATTENUATOR ATTENUATION | EXCITATION LIGHT SOURCE OPTICAL POWER | LIGHT SOURCE OPTICAL POWER |
|---|---|---|---|
| P1 | A | X | M |
| P2 | B | Y | N |
| ... | ... | ... | ... |

Fig. 13

PLUGGABLE OPTICAL MODULE, OPTICAL COMMUNICATION SYSTEM, AND CONTROL METHOD OF PLUGGABLE OPTICAL MODULE

CROSS-REFERENCE TO RELATED PATENT APPLICATIONS

This application is a National Stage Entry of International Application No. PCT/JP2018/020173, filed May 25, 2018, which claims priority from Japanese Patent Application No. 2017-138042, filed Jul. 14, 2017. The entire contents of the above-referenced applications are expressly incorporated herein by reference.

TECHNICAL FIELD

The present invention relates to a pluggable optical module, an optical communication system, and a control method of a pluggable optical module.

BACKGROUND ART

Due to rapid increase in communication traffic, expansion of transmission capacity has been needed. In response to this, a speed and capacity of an optical network system have been progressed. Thus, miniaturization and speed-up of an optical module, which is a key device of the optical network system, is required.

Digital coherent communication that performs multi-level phase modulation of an optical signal has become general as a method for achieving large capacity of an optical communication system. Even in the digital coherent communication, the miniaturization and speed-up of the optical module are also required. In recent years, use of a pluggable optical module that can be inserted into and removed from an optical communication apparatus has been progressed in order to flexibly construct the optical communication system.

In general, a digital coherent transceiver used for the digital coherent communication includes both of an optical signal transmission function and an optical signal reception function. In this case, a wavelength-tunable light source that outputs a light modulated by an optical modulator in the optical signal transmission function so as to generate an optical signal, and a wavelength-tunable light source that outputs a local oscillation light used for detecting an optical signal in the optical signal reception function are needed. In contrast to this, a transceiver that branches a light output from one light source and distributes the branched light to a transmission side and a reception side has been proposed (e.g. Patent Literatures 1 and 2).

In such transceivers, a configuration in which an erbium-doped optical fiber amplifier (EDFA) is inserted in an output side of the modulator in order to reinforce light intensity (optical power) of the optical signal to be transmitted has been known (e.g. Patent Literatures 1). When the optical signal is incident on the EDFA in a state in which an excitation light is input from an excitation light source to the EDFA, the optical signal is amplified and output from the EDFA.

CITATION LIST

Patent Literature

[Patent Literature 1] Japanese Unexamined Patent Application Publication No. 2016-82590

[Patent Literature 2] International Patent Publication No. WO 2014-141685

SUMMARY OF INVENTION

Technical Problem

In the case of disposing the EDFA, as described above, the excitation light source providing the EDFA with the excitation light is needed. Additionally, in the pluggable optical module including the digital coherent transceiver may be instructed to block the output of the optical signal or to switch the wavelength of the optical signal from a host side apparatus. In this case, it is necessary to once stop or block the optical output of the pluggable optical module and to restart the optical output after performing processing of wavelength switching or the like in order to prevent an undesired optical signal from leaking from the pluggable optical module.

Considering that various type pluggable optical modules can be inserted into the host side apparatus, when the host side apparatus provides the pluggable optical module with the instruction, it is desired that the pluggable optical module can autonomously perform the processing from the operation of stopping or blocking the optical output to the operation of starting the optical output.

The present invention has been made in view of the aforementioned circumstances and aims to prevent a leaking light in a pluggable optical module when stopping or blocking optical output.

Solution to Problem

An aspect of the present invention is a pluggable optical module capable of being inserted into and removed from an optical communication apparatus, the pluggable optical module including: a light source configured to output a light; a first branching unit configured to branch the light output from the light source into a first branched light and a second branched light; a modulator configured to modulate the first branched light to output a first optical signal; a receiver configured to cause the second branched light to interfere with a second optical signal to receive the second optical signal; a fiber type optical amplifier configured to amplify the first optical signal output from the modulator; an excitation light source configured to output an excitation light exciting the fiber type optical amplifier to the fiber type optical amplifier; a first optical attenuator configured to attenuate optical power of the first optical signal amplified by the fiber type optical amplifier; and a control unit configured to control attenuation of the first optical signal in the first optical attenuator, in which the control unit adjusts the attenuation of the first optical signal and adjusts an output of the excitation light from the excitation light source.

An aspect of the present invention is an optical communication system including: an optical communication apparatus; and a pluggable optical module configured to be capable of being inserted into and removed from the optical communication apparatus, in which the pluggable optical module includes: a light source configured to output a light; a first branching unit configured to branch the light output from the light source into a first branched light and a second branched light; a modulator configured to modulate the first branched light to output a first optical signal; a receiver configured to cause the second branched light to interfere with a second optical signal to receive the second optical signal; a fiber type optical amplifier configured to amplify the first optical signal output from the modulator; an excitation light source configured to output an excitation light exciting the fiber type optical amplifier to the fiber type optical amplifier; a first optical attenuator configured to attenuate optical power of the first optical signal amplified by the fiber type optical amplifier; and a control unit configured to control attenuation of the first optical signal in the first optical attenuator, in which the control unit adjusts the attenuation of the first optical signal.

An aspect of the present invention is a control method of a pluggable optical module, the pluggable optical module capable of being inserted into and removed from an optical communication apparatus, the pluggable optical module including: a light source configured to output a light; a first branching unit configured to branch the light output from the light source into a first branched light and a second branched light; a modulator configured to modulate the first branched light to output a first optical signal; a receiver configured to cause the second branched light to interfere with a second optical signal to receive the second optical signal; a fiber type optical amplifier configured to amplify the first optical signal output from the modulator; an excitation light source configured to output an excitation light exciting the fiber type optical amplifier to the fiber type optical amplifier; a first optical attenuator configured to attenuate optical power of the first optical signal amplified by the fiber type optical amplifier; and a control unit configured to control attenuation of the first optical signal in the first optical attenuator, the control method including causing the control unit to adjust the attenuation of the first optical signal and adjusts an output of the excitation light from the excitation light source.

According to the present invention, it is possible to prevent a leaking light in a pluggable optical module when stopping or blocking optical output.

BRIEF DESCRIPTION OF DRAWINGS

FIG. 13 illustrates an example of a lookup table indicating a relation between a target value of light intensity (optical power) of the optical signal, and setting values of a light source, an excitation light source, and an optical attenuator;

DESCRIPTION OF EXAMPLE EMBODIMENTS

Figure 1:
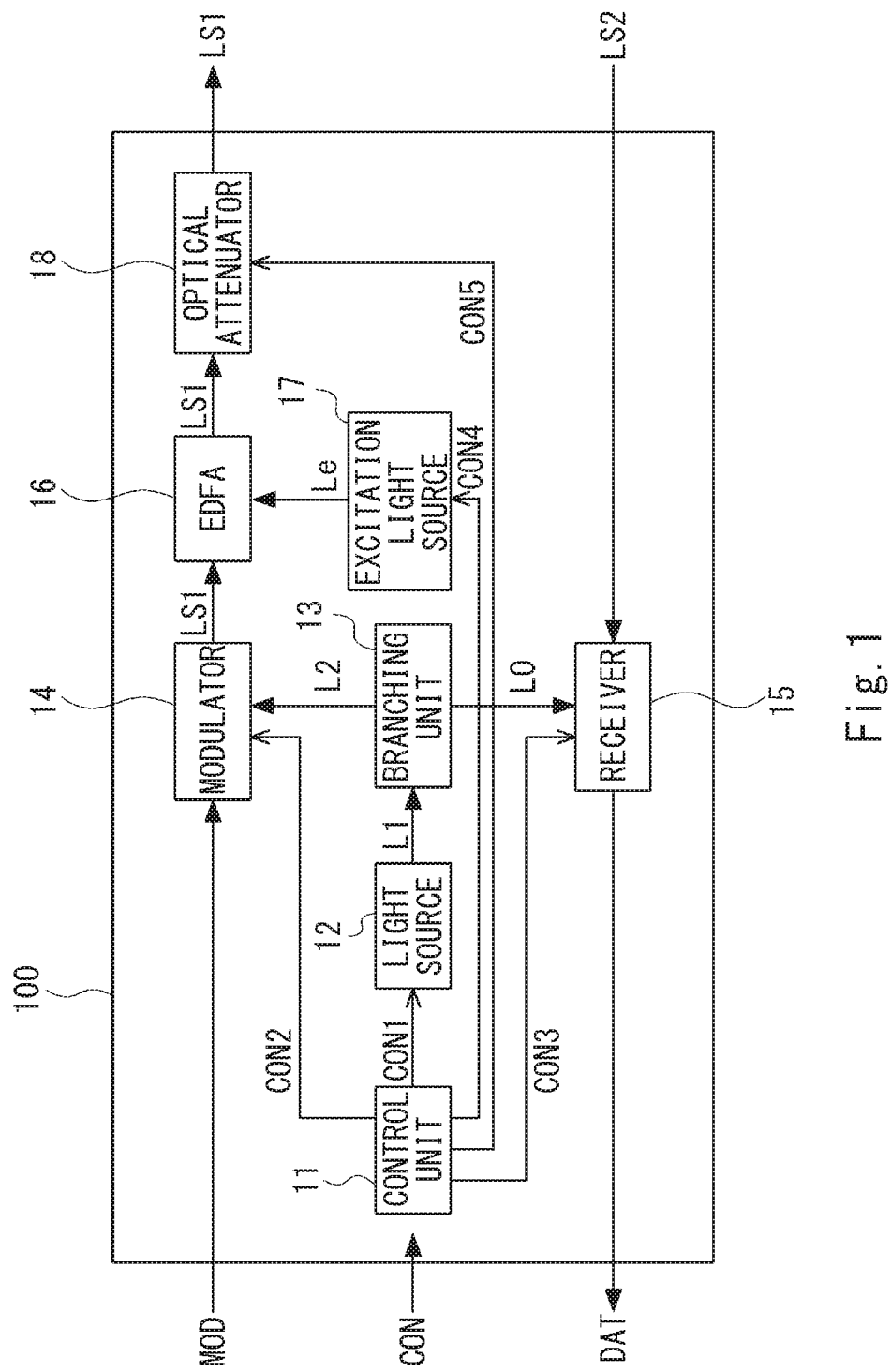
FIG. 1 is a block diagram schematically illustrating a basic configuration of a pluggable optical module according to a first example embodiment.

Example embodiments of the present invention will be described below with reference to the drawings. The same components are denoted by the same reference numerals throughout the drawings, and a repeated explanation is omitted as needed.

First Example Embodiment

Figure 2:
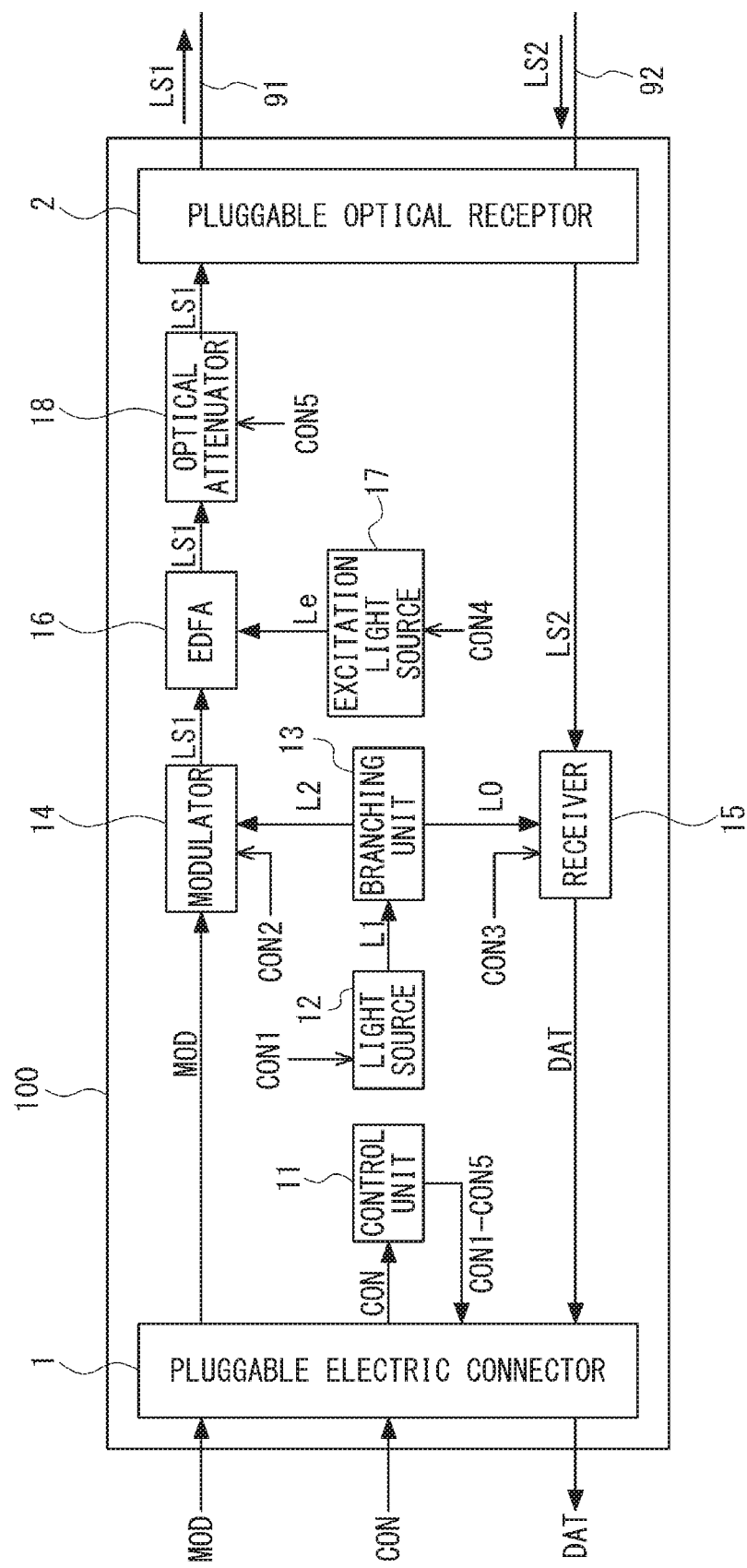
FIG. 2 is a block diagram schematically illustrating a configuration of the pluggable optical module according to the first example embodiment.
Figure 3:
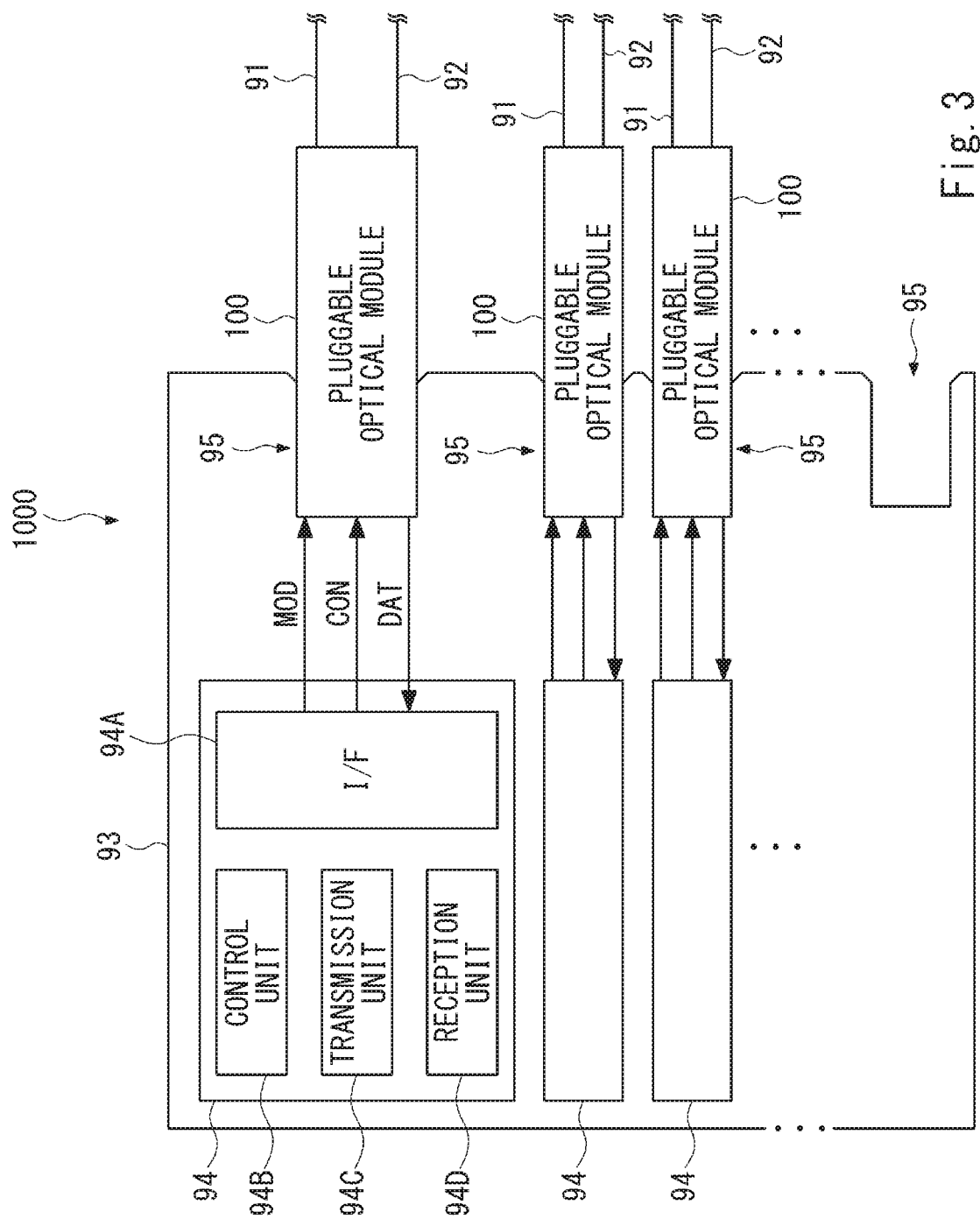
FIG. 3 is a is a block diagram illustrating a configuration example of an optical communication system in which the pluggable optical module according to the first example embodiment is mounted.

A pluggable optical module 100 according to a first example embodiment will be described. The pluggable optical module 100 is configured, for example, as an optical transceiver that perform digital coherent optical communication with an external apparatus. FIG. 1 is a block diagram schematically illustrating a basic configuration of the pluggable optical module 100 according to the first example embodiment. FIG. 2 is a block diagram schematically illustrating a configuration of the pluggable optical module 100 according to the first example embodiment. FIG. 3 is a block diagram illustrating a configuration example of an optical communication system 1000 in which the pluggable optical module 100 according to the first example embodiment is mounted.

As illustrated in FIG. 2, the pluggable optical module 100 is configured in such a manner that connectors disposed at ends of optical fibers 91 and 92 can be inserted into and removed from the pluggable optical module 100. A LC connector and MU connector can be used as the connectors of the optical fibers 91 and 92. The pluggable optical module 100 is controlled based on a control signal CON input from an optical communication apparatus 93 serving as a communication host apparatus. The pluggable optical module 100 may receive not only the control signal CON but also a modulation signal MOD that is a data signal from the optical communication apparatus 93. In this case, the pluggable optical module 100 can output an optical signal LS1 (also referred as a first optical signal) that is modulated based on the received modulation signal MOD through the optical fiber 91. The pluggable optical module 100 can also output a data signal DAT that is generated by demodulating an optical signal LS2 (also referred as a second optical signal) that is received from the outside through the optical fiber 92 to the optical communication apparatus 93.

The optical communication apparatus 93 performs communication signal processing such as flaming processing of a communication data signal from the pluggable optical module 100 or a communication data signal input to the pluggable optical module 100, for example. The detail of the optical communication apparatus 93 will be described below.

The pluggable optical module 100 includes a pluggable electric connector 1, a pluggable optical receptor 2, a control unit 11, a light source 12, a branching unit 13, a modulator 14, a receiver 15, an Erbium doped optical fiber amplifier (EDFA) 16, an excitation light source 17, and an optical attenuator 18.

The pluggable electric connector 1 is configured as an I/O (Input/Output) port that can be inserted into and removed from the optical communication apparatus 93. The optical communication apparatus 93 outputs the control signal CON that is an electric signal to the control unit 11 and outputs the modulation signal MOD that is an electric signal to the modulator 14 through the pluggable electric connector 1. Further, the receiver 15 outputs the data signal DAT to the optical communication apparatus 93 through the pluggable electric connector 1.

The pluggable optical receptor 2 is configured in such a manner that the connectors of the optical fibers 91 and 92 can be inserted into and removed from the pluggable optical receptor 2. The optical signal LS1 is output to the optical fiber 91 through the pluggable optical receptor 2. The optical signal LS2 propagating through the optical fiber 92 and then being input to the pluggable optical module 100 is input to the receiver 15 through the pluggable optical receptor 2. Although the pluggable optical receptor 2 has been described as a single component, it should be appreciated that a pluggable optical receptor that the optical fiber 91 can be inserted into and removed from and a pluggable optical receptor that the optical fiber 92 can be inserted into and removed from may be separately disposed.

The control unit 11 is configured to be capable of controlling operations of each component in the optical module 100, that is, the light source 12, the modulator 14, the receiver 15, the excitation light source 17, and the optical attenuator 18 in response to the control signal CON. In this example, the control unit 11 generates control signals CON1 to CON5 in response to the control signal CON and outputs the control signals CON1 to CON5 to the light source 12, the modulator 14, the receiver 15, the excitation light source 17, and the optical attenuator 18, for example, through the pluggable electric connector 1, respectively.

Figure 4:
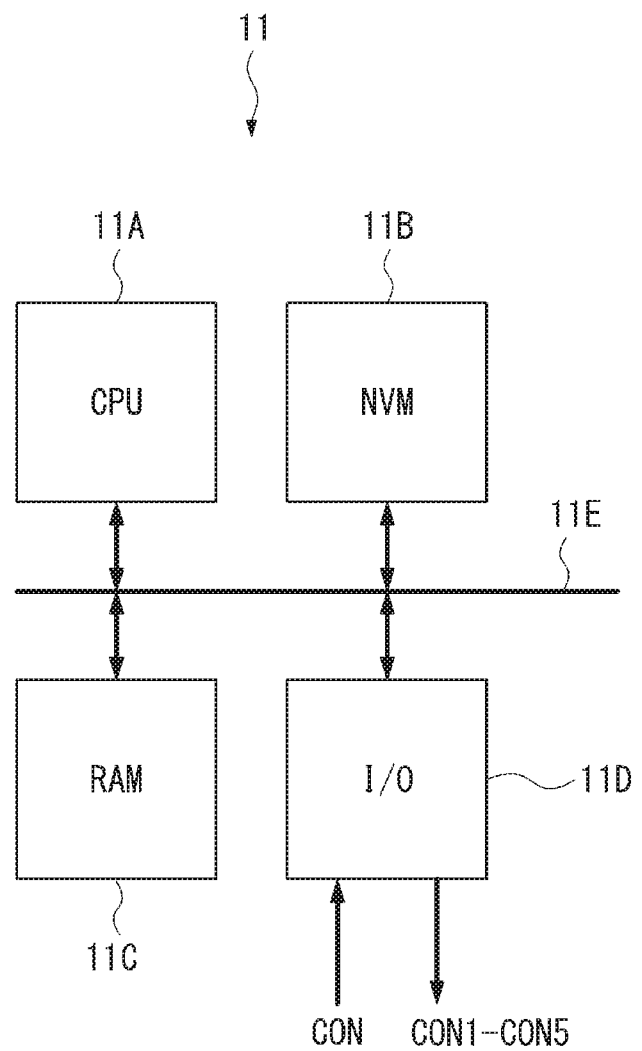
FIG. 4 is a block diagram schematically illustrating a configuration of a control unit according to the first example embodiment.

The control unit 11 may be configured using hardware resource such as a computer. A configuration example of the control unit 11 will be described below. FIG. 4 is a block diagram schematically illustrating the configuration of the control unit 11 according to the first example embodiment.

The control unit 11 includes a central processing unit (CPU) 11A, a non-volatile memory (NVM) 11B, a random access memory (RAM) 11C, an input/output port (I/O) 11D, and an internal bus 11E. Although not illustrated, the control unit 11 may also include other functional block and module such as an analog module and a clock pulse generator (CPG). Although not illustrated, the control unit 11 may include, for example, an analog to digital (A/D) converter and digital to analog (D/A) converter as the analog modules.

The CPU 11A reads a command mainly from the NVM 11B and processes it, and the RAM 11C and I/O 11D serving as working data areas are read and written by the CPU 11A. The CPU 11A executes a program and thereby the control unit 11 achieves the necessary processing.

The NVM 11B starts erase and write operations, for example, in response to a command from the CPU 11A or the like. For example, the control unit 11 may read control information and the program from the NVM 11B and execute those.

The RAM 11C is used for works of the CPU 11A. The RAM 11C is also used for temporarily storing written contents when the NVM 11B is rewritten.

The I/O 11D has various input/output functions and operates according to the program execution of the CPU 11A. The I/O 11D receives the control signal CON output from the optical communication apparatus 93 and transfer the control signal CON to the control unit 11 through the internal bus 11E. The I/O 11D also receives the various control signals CON1 to CON5 output from the control unit 11 through the internal bus 11E and transfer the control signals CON1 to CON5 to each part of the pluggable optical module 100, for example, through the pluggable electric connector 1.

The light source 12 is configured as a wavelength-tunable light source that outputs a light having a wavelength determined in response to the control signal CON1. For example, the light source 12 may be configured as a light source unit including a semiconductor optical amplifier and a wavelength filter.

The branching unit 13 (also referred to as a first branching unit) branches the light output from the light source 12 into a light L2 (also referred to as a first branched light) and a local oscillation light LO (also referred to as a second branched light). Various optical components capable of branching an incident light such as a Y-branch, a beam splitter, and a prism may be used as the branching unit 13.

The modulator 14 modulates the light L2 branched by the branching unit 13 based on the modulation signal MOD input from the optical communication apparatus 93 through the pluggable electric connector 1 and outputs the modulated light as the optical signal LS1. The operation of the modulator 14 is controlled based on the control signal CON2 input from the control unit 11. Thus, the modulator 14 can perform an appropriate modulation operation according to the wavelength of the light L2.

The modulator 14 is configured as a Mach-Zehnder type optical modulator, for example. When the modulator 14 is configured as the Mach-Zehnder type optical modulator, the light L2 can be modulated by applying a signal in response to the modulation signal MOD to phase modulation areas disposed on optical waveguides of the Mach-Zehnder type optical modulator. The modulator 14 can modulate the light L2 with various modulation methods such as phase modulation, amplitude modulation and polarization modulation, or a combination of the various modulation methods. Here, for example, the Mach-Zehnder type optical modulator is a semiconductor optical modulator or another optical modulator.

Figure 5:
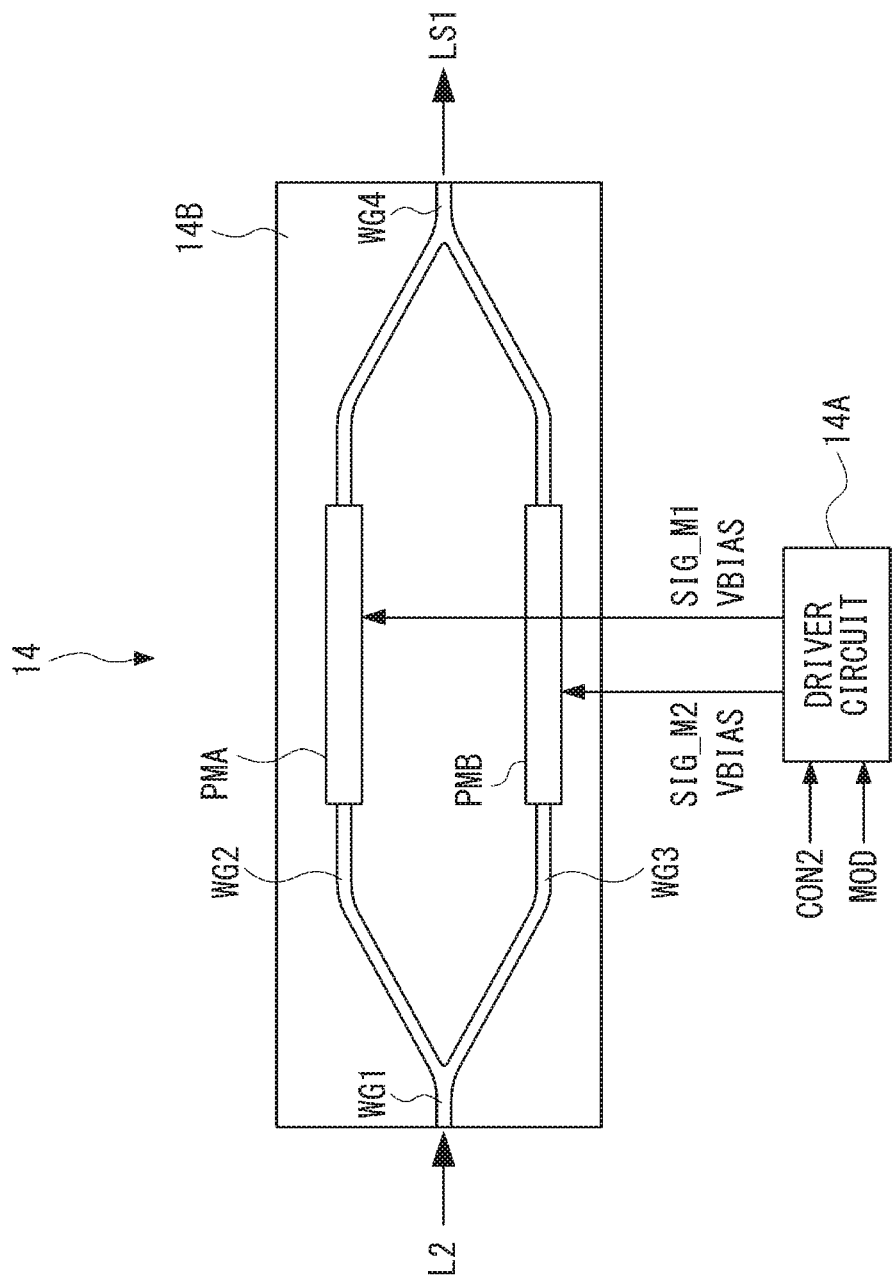
FIG. 5 is a diagram schematically illustrating a configuration of a modulator according to the first example embodiment.

The above-described phase modulation area is an area that includes an electrode formed on the optical waveguide. An effective refractive index of the optical waveguide below the electrode is changed by applying an electric signal, e.g. a voltage signal, to the electrode on the phase modulation area. As a result, a substantial optical length of the optical waveguide in the phase modulation area can be changed. Thus, a phase of the optical signal propagating through the optical waveguide in the phase modulation area can be changed. In the Mach-Zehnder type optical modulator, a phase difference is caused between the optical signals propagating through two optical waveguides and then the two optical signals are combined. Thus, the combined optical signal can be modulated A configuration of the modulator 14 will be described. FIG. 5 is a diagram schematically illustrating the configuration of the modulator 14 according to the first example embodiment. The optical modulator 14 is configured as a general Mach-Zehnder type optical modulator. The modulator 14 includes a driver circuit 14A, optical waveguides WG1 to WG4 formed on a substrate 14B, and phase modulation areas PMA and PMB. The light L2 output from the light source 12 is input to one end of the optical waveguide WG1. The other end of the optical waveguide WG1 is optically connected with one end of the optical waveguide WG2 and one end of the optical waveguide WG3. Thus, a light propagating through the optical waveguide WG1 is branched toward the optical waveguide WG2 and the optical waveguide WG3. The other end of the optical waveguide WG2 and the other end of the optical waveguide WG3 are connected with one end of the optical waveguide WG4. On the optical waveguide WG2, the phase modulation area PMA that changes a phase of a light propagating through the optical waveguide WG2 is disposed.

On the optical waveguide WG3, the phase modulation area PMB that changes a phase of a light propagating through the optical waveguide WG3 is disposed. The optical signal LS1 is output from the other end of the optical waveguide WG4.

The driver circuit 14A can control the modulation operation of the modulator 14. The driver circuit 14A can also control a bias point of the modulator 14 by applying a bias voltage VBIAS to one or both of the phase modulation areas PMA and PMB in response to the control signal CON2. Hereinafter, it is assumed that the driver circuit 14A applies the bias voltage to both of the phase modulation areas PMA and PMB. The driver circuit 14A also applies a signal to one or both of the phase modulation areas PMA and PMB in response to the modulation signal MOD and thereby the optical signal LS1 generated by modulating the light L2 is output from the modulator 14. In this example, the driver circuit 14A applies a modulation signal SIG_M1 to the phase modulation area PMA in response to the modulation signal MOD and applies a modulation signal SIG_M2 to the phase modulation area PMB in response to the modulation signal MOD.

The receiver 15 demodulates the light LS2 received from the outside through the optical fiber 92 by causing the light LS2 to interfere with the local oscillation light LO. The receiver 15 outputs the data signal DAT that is the demodulated electric signal to the optical communication apparatus 93 through the pluggable electric connector 1. The receiver 15 is controlled by the control signal CON3 output from the control unit 11 and can perform the appropriate demodulation operation according to the wavelength of the optical signal LS2 (or the local oscillation light LO)

Figure 6:
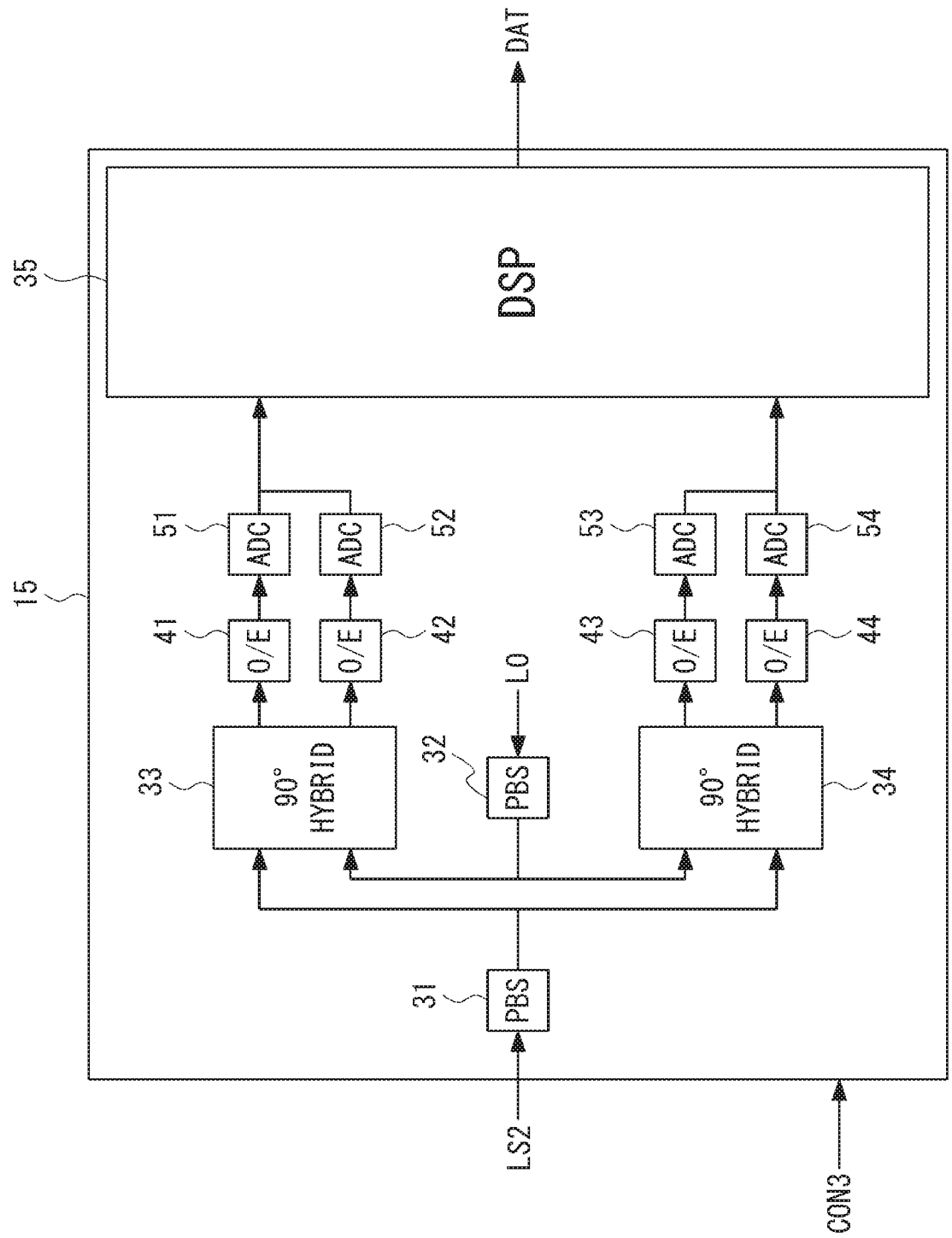
FIG. 6 is a block diagram illustrating a configuration example of a receiver according to the first example embodiment.

The receiver 15 is, for example, a reception unit performing digital coherent reception for demodulating a DP-QPSK (Dual-Polarization Quadrature Phase-Shift Keying) optical signal to an electric signal. FIG. 6 is a block diagram illustrating a configuration example of the receiver 15 according to the first example embodiment. As illustrated in FIG. 6, the receiver 15 includes a polarization beam splitter (referred to as a PBS hereinafter) 31, a PBS 32, 90-degree hybrids 33 and 34, optical/electrical converters (referred to as O/Es hereinafter) 41 to 44, analog to digital converters (referred to as ADCs hereinafter) 51 to 54, a digital signal processor (referred to as a DSP hereinafter) 35.

The optical signal LS2 (e.g. the DP-QPSK optical signal) is input to the PBS 31 through the pluggable optical receptor 2. The PBS 31 splits the input optical signal LS2 into two polarized components orthogonal to each other. Specifically, the PBS 31 splits the optical signal LS2 into an x-polarized component $x_{in}$ and a y-polarized component $Y_{in}$ orthogonal to each other. The x-polarized component $x_{in}$ is input to the 90-degree hybrid 33 and the y-polarized component $y_{in}$ is input to the 90-degree hybrid 34.

The local oscillation light LO is input to the PBS 32 from the light source 12. In the present example embodiment, the PBS 32 splits the local oscillation light LO into two polarized components orthogonal to each other (an x-polarized component $LO_x$ and a y-polarized component $LO_y$). The x-polarized component $LO_x$ of the local oscillation light LO is input to the 90-degree hybrid 33 and the y-polarized component $LO_y$ of the local oscillation light LO is input to the 90-degree hybrid 34.

The 90-degree hybrid 33 performs optical detection by causing the x-polarized component $LO_x$ of the local oscillation light LO and the x-polarized component $x_{in}$ to interfere with each other, and outputs an I (in-phase) component (referred to as an $x_{in}$-I component) and a Q (quadrature-phase) component (referred to as an $x_{in}$-Q component) whose phase is different from that of the I component by 90 degrees as detected lights. The 90-degree hybrid 34 performs optical detection by causing the y-polarized component $LO_y$ of the local oscillation light and the y-polarized component yin to interfere with each other, and outputs an I component (referred to as a $y_{in}$-I component) and a Q component (referred to as a $y_{in}$-Q component) as detected lights.

The optical/electrical converters 41 to 44 photoelectrically convert the four optical signals (the $x_{in}$-I component, the $x_{in}$-Q component, the $y_{in}$-I component and the $y_{in}$-Q component) output from the 90-degree hybrids 33 and 34, respectively. Then the optical/electrical converters 41 to 44 output analog electric signals generated by the optical/electrical conversions to the ADCs 51 to 54, respectively. Specifically, the optical/electrical converter 41 photoelectrically converts the $x_{in}$-I component and outputs the generated analog electric signal to the ADC 51. The optical/electrical converter 42 photoelectrically converts the $x_{in}$-Q component and outputs the generated analog electric signal to the ADC 52. The optical/electrical converter 43 photoelectrically converts the $y_{in}$-I component and outputs the generated analog electric signal to the ADC 53. The optical/electrical converter 44 photoelectrically converts the $y_{in}$-Q component and outputs the generated analog electric signal to the ADC 54.

The ADCs 51 to 54 convert the analog electric signals output from the optical/electrical converters 41 to 44 into digital signals and output the converted digital signals to the DSP 35, respectively.

The DSP 35 performs predetermined polarization separation digital signal processing on the input digital signals and outputs the data signal DAT including the demodulated signal. The data signal DAT is output to the external optical communication apparatus 93 through the pluggable electric connector 1.

Subsequently, the configuration of the pluggable optical module 100 will be descried with reference to FIGS. 1 and 2. The EDFA16 is a fiber type optical amplifier. The EDFA16 amplifies the optical signal LS1 output from the modulator 14 and outputs the amplified optical signal LS1.

The excitation light source 17 outputs an excitation light Le to the EDFA16 for exciting the EDFA16. The operation of the excitation light source 17 is controlled by the control signal CON4 output form the control unit 11

The optical attenuator 18 (also as referred to as a first optical attenuator) is configured as a variable optical attenuator (VOA) attenuating the optical signal LS1. For example, the variable optical attenuator (VOA) may be achieved by the semiconductor optical amplifier capable of controlling power of an output light by gain control, a shutter physically blocking the light, or the like. In other words, the optical attenuator 18 includes various optical components that can function as an optical power adjustment unit capable of controlling or blocking the output light such as the above-described semiconductor optical amplifier and the shutter. Thus, the light intensity (the optical power) of the optical signal LS1 can be adjusted to a desired value. The operation of the optical attenuator 18 is controlled by the control signal CON5 output form the control unit 11. The optical signal LS1 passing through the optical attenuator 18 is output to the optical fiber 91 through the pluggable optical receptor 2

Next, the optical communication apparatus 93 will be described with reference to FIG. 3. As illustrated in FIG. 3, the optical communication apparatus 93 includes a plurality of slots 95. Each slot 95 is configured to allow the pluggable optical module 100 to be inserted thereinto or removed therefrom. The pluggable optical module 100 communicates with a substrate 94 corresponding to the slot 95 which the pluggable optical module 100 is inserted into and included in a plurality of the substrates 94 disposed in the optical communication apparatus 93. An interface unit (I/F) 94A, a control unit 94B, a transmission unit 94C, and a reception unit 94D are disposed on the substrate 94. The I/F 94A mediates the communication between the pluggable optical module 100, and the control unit 94B, the transmission unit 94C, and the reception unit 94D. The control unit 94B is configured to be capable of controlling the operation of the pluggable optical module 100 with the control signal CON and also controlling the transmission unit 94C and the reception unit 94D. The transmission unit 94C is configured as a transmission framer, for example, and configured to be capable of performing desired signal processing on the signal received from the outside to output the modulation signal MOD to the pluggable optical module 100. The reception unit 94D is configured as a reception framer, for example, and configured to be capable of performing desired signal processing on the data signal DAT output from the pluggable optical module 100 to convert the data signal DAT into a signal applicable to the optical communication apparatus 93 or a device connected to the optical communication apparatus 93.

According to the above-described configuration, in the pluggable optical module for digital coherent communication, the light L1 to be modulated can be provided to the modulator 14 and the local oscillation light LO used for demodulating the received optical signal LS2 can be provided by disposing only one light source. Therefore, because it is not necessary to separately dispose a light source for providing the light L1 and a light source for providing the local oscillation light LO, miniaturization and manufacturing cost reduction of the pluggable optical module 100 can be achieved.

Figure 7:
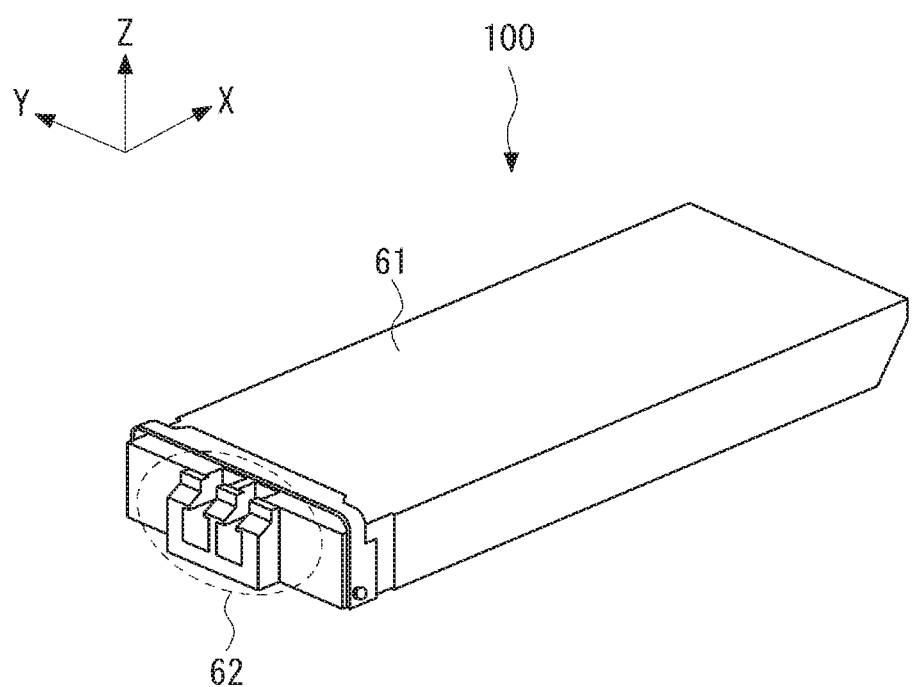
FIG. 7 is a perspective view of the pluggable optical module according to the first example embodiment viewed from a side of optical fibers.
Figure 8:
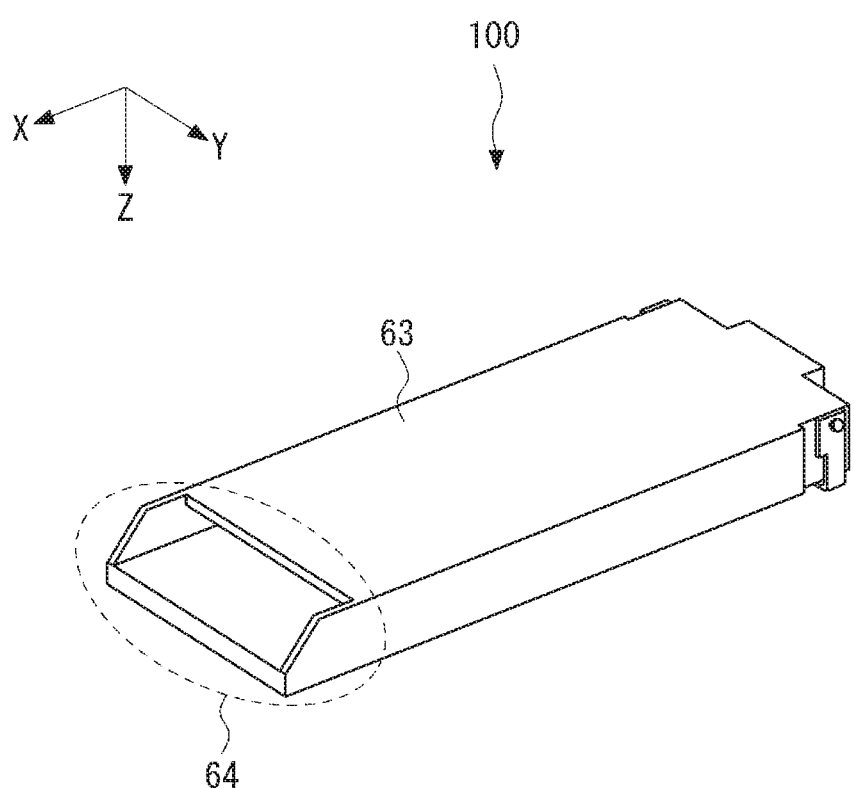
FIG. 8 is a perspective view of the pluggable optical module according to the first example embodiment viewed from a side of the optical communication apparatus.

Next, the appearance of the pluggable optical module 100 will be illustrated. FIG. 7 is a perspective view of the pluggable optical module 100 according to the first example embodiment viewed from a side of the optical fibers 91 and 92. A numerical sign 61 shown in FIG. 7 indicates an upper surface of the pluggable optical module 100. A numerical sign 62 shown in FIG. 7 indicates an insertion port of the optical fiber of the pluggable optical receptor 2. FIG. 8 is a perspective view of the pluggable optical module 100 according to the first example embodiment viewed from a side of the optical communication apparatus 93. A numerical sign 63 shown in FIG. 8 indicates a lower surface of the pluggable optical module 100. A numerical sign 64 shown in FIG. 8 indicates a connection part of the pluggable electric connector 1 connected with the optical communication apparatus 93.

Next, the operation of the pluggable optical module 100 will be described. As described above, the pluggable optical module 100 may be instructed from the outside to switch the wavelength of the optical signal LS1 to be output, or to stop or interrupt the output of the optical signal LS1. In this case, it is required to prevent the excitation light Le output from the excitation light source 17 for exciting the EDFA16 from leaking to the optical fiber 91 through the pluggable optical receptor 2. Therefore, the pluggable optical module 100 operates to absolutely prevent the leakage of the excitation light Le when the output of the optical signal LS1 is stopped or blocked.

Figure 9:
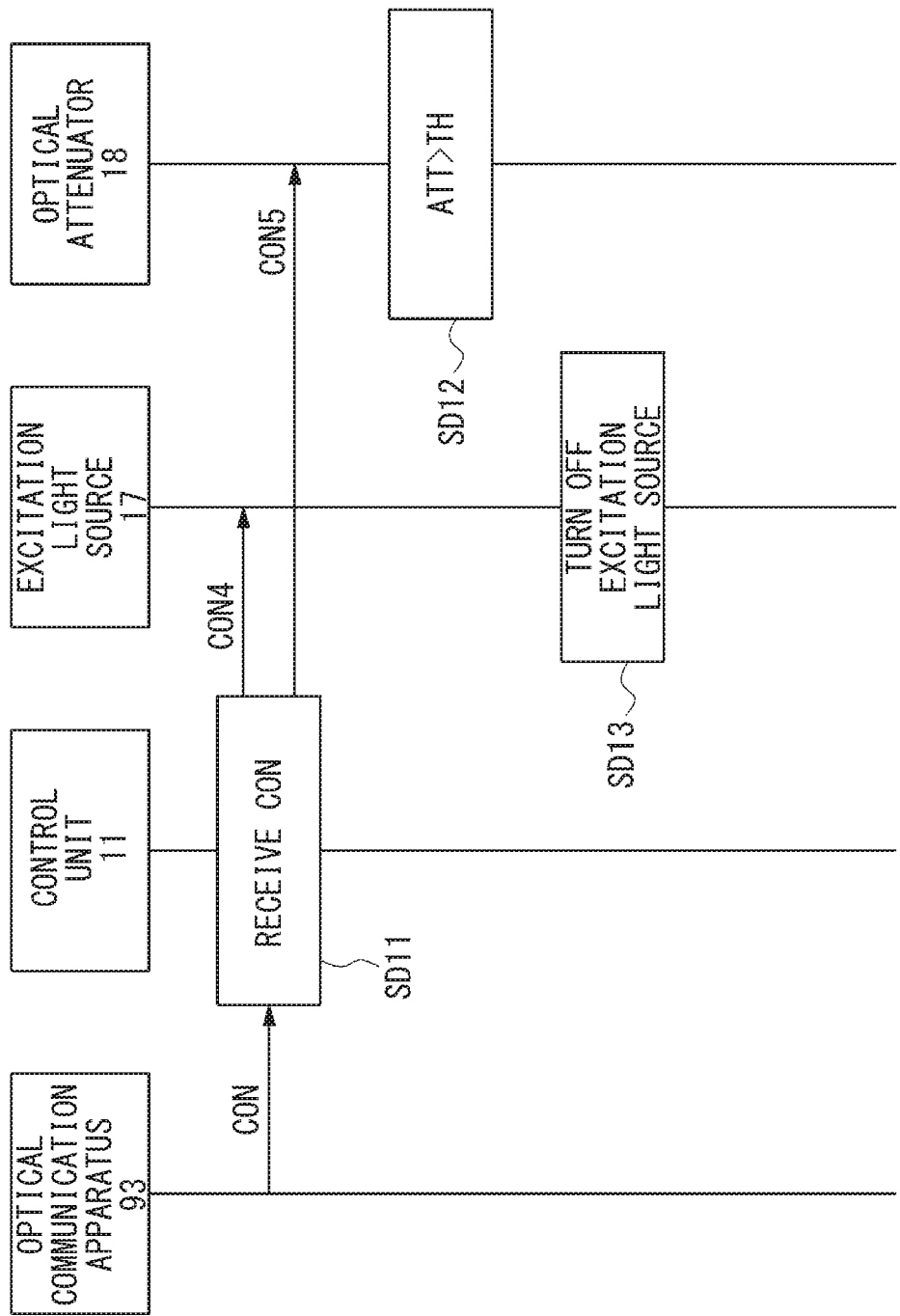
FIG. 9 is a sequence diagram schematically illustrating an optical output blocking operation of the pluggable optical module according to the first example embodiment.

FIG. 9 is a sequence diagram schematically illustrating an optical output blocking operation of the pluggable optical module 100 according to the first example embodiment.

Step SD11

The optical communication apparatus 93 outputs the control signal CON. The control unit 11 receives the control signal CON through the pluggable electric connector 1. The received control signal includes an optical output blocking instruction such as an instruction to block the output of the optical signal and an instruction to switch the wavelength of the optical signal.

Step SD12

The control unit 11 controls the optical attenuator 18 using the control signal CON5 so that the optical attenuation ATT of the optical attenuator 18 becomes larger than a predetermined value TH in response to the control signal CON. Thus, the optical attenuator 18 functions as the shutter blocking the excitation light Le. The control unit 11 may control the optical attenuator 18 so that the optical attenuation ATT becomes the maximum value or an enough large value.

Step SD13

Next, the control unit 11 controls the excitation light source 17 using the control signal CON4 to stop the output of the excitation light Le from the excitation light source 17 in response to the control signal CON.

Although the step SD13 is executed after the step SD12 as described above, the execution order of the steps is not limited to this. The step SD12 may be executed after the step SD13 or the steps SD12 and SD13 may be executed in parallel.

According to the above operation, it is possible to prevent the excitation light Le output from the excitation light source 17 from leaking from the pluggable optical module 100 when receiving the optical signal blocking instruction from the optical communication apparatus 93.

After the completion of the step SD13, the control unit 11 may output a signal notifying that the optical output has been blocked to the optical communication apparatus 93 through the pluggable electric connector 1. Thus, the optical communication apparatus 93 can confirm the completion of the optical output blocking that has been instructed to the pluggable optical module 100.

When the wavelength of the optical signal is included in the control signal CON received by the control unit 11 from the optical communication apparatus 93, the control unit 11 may instruct the light source 12 to switch the wavelength of the light L1 using the control signal CON1 after the completion of the step SD13. Thus, the optical signal can be switched to a desired wavelength.

Figure 10:
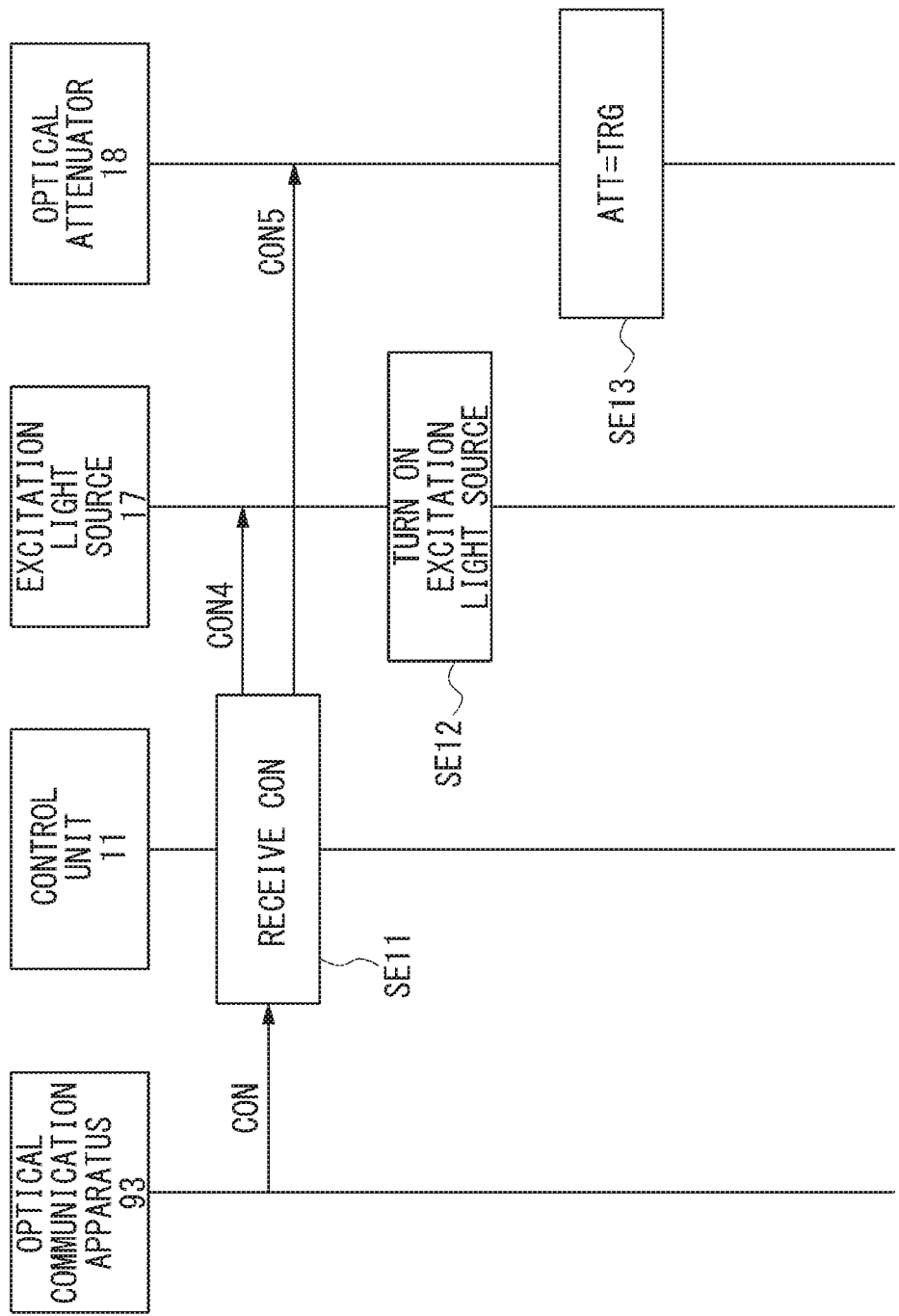
FIG. 10 is a sequence diagram schematically illustrating an optical output start operation of the pluggable optical module according to the first example embodiment.

Next, the optical output start operation of the pluggable optical module 100 will be described. For example, after the optical output blocking operation described above, the output of the optical signal is resumed and the transmission of the optical signal through the optical fiber is restarted. FIG. 10 is a sequence diagram schematically illustrating the optical output start operation of the pluggable optical module 100 according to the first example embodiment.

Step SE11

The optical communication apparatus 93 outputs the control signal CON. The control unit 11 receives the control signal CON through the pluggable electric connector 1. The received control signal includes an instruction to start the output of the optical signal.

Step SE12

The control unit 11 controls the excitation light source 17 using the control signal CON4 to output the excitation light Le. Thus, the excitation light Le is output from the excitation light source 17 to the EDFA 16 in response to the control signal CON.

Step SE13

After that, the control unit 11 controls the optical attenuator 18 using the control signal CON5 so that the optical attenuation ATT of the optical attenuator 18 becomes a value TRG appropriate for outputting the optical signal LS1.

According to the above operation, the excitation light Le is output from the excitation light source 17 to the EDFA 16 when receiving the optical output start instruction from the optical communication apparatus 93. Thus, it is possible to amplify the optical signal LS1 with the EDFA 16, attenuate the optical signal LS1 with the optical attenuator 18 by a predetermined amount, and then output the optical signal LS1 to the optical fiber 91.

Further, after the completion of the step SE13, the control unit 11 may output a signal notifying the completion of the optical output start operation to the optical communication apparatus 93 through the pluggable electric connector 1. Thus, the optical communication apparatus 93 can confirm the completion of the optical output start operation that has been instructed to the pluggable optical module 100.

Second Example Embodiment

Figure 11:
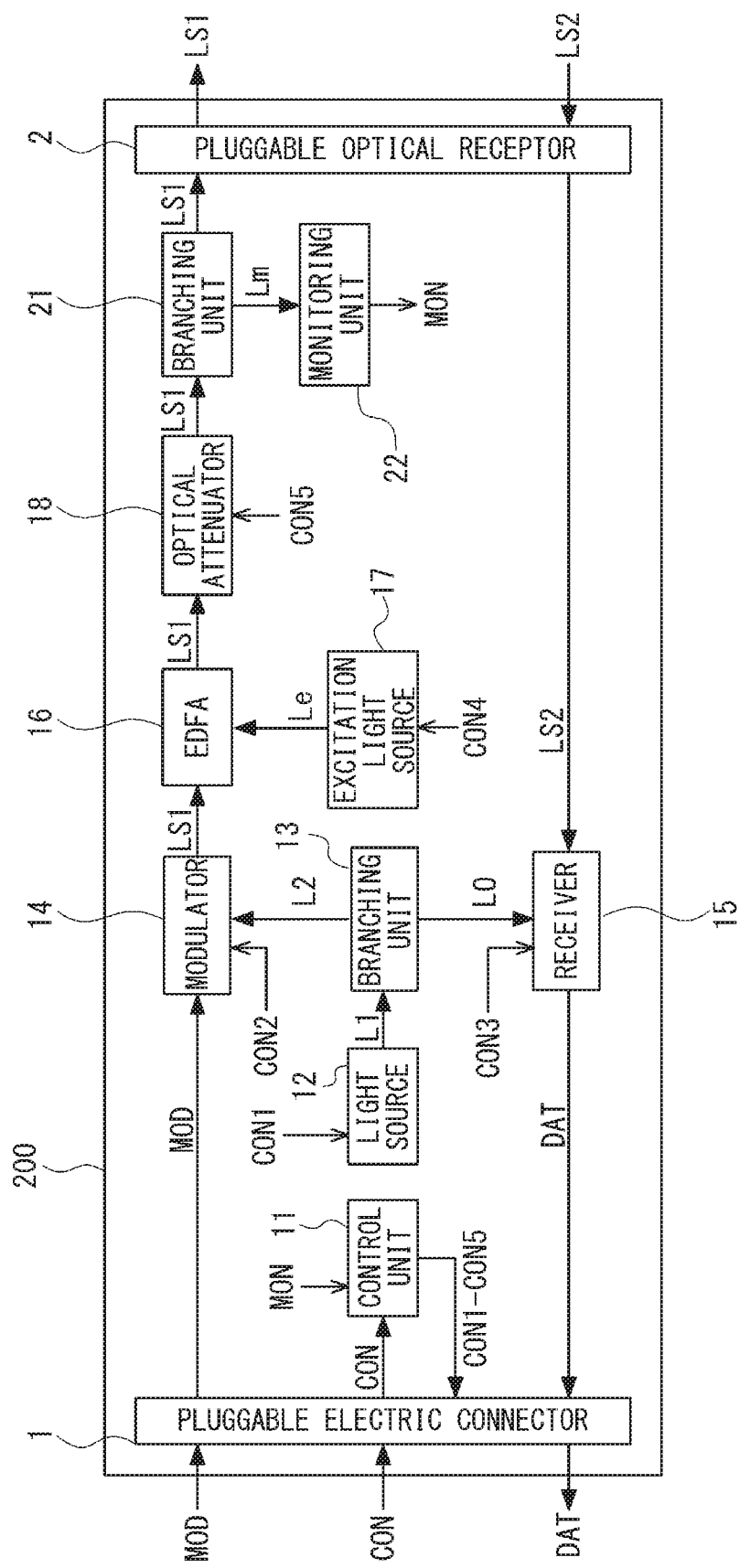
FIG. 11 is a block diagram schematically illustrating a configuration of a pluggable optical module according to a second example embodiment.

Next, a pluggable optical module 200 according to a second example embodiment will be described. The pluggable optical module 200 is an alternative example of the pluggable optical module 100 according to the first example embodiment. FIG. 11 is a block diagram schematically illustrating a configuration of the pluggable optical module 200 according to the second example embodiment. The pluggable optical module 200 has a configuration in which a branching unit 21 and a monitoring unit 22 are added to the pluggable optical module 100. Since the other configuration of the pluggable optical module 200 is the same as that of the pluggable optical module 100, description thereof will be omitted.

The branching unit 21 (also referred to as a second branching unit) is inserted between the pluggable electric connector 1 and the optical attenuator 18. The branching unit 21 branches a part of the optical signal LS1 and the branched monitor light Lm is output to the monitoring unit 22.

The monitoring unit 22 includes a photoelectric conversion element such as a photo diode, for example, and detects the light intensity (the optical power) of the optical signal LS1 output to the optical fiber 91 based on the monitor light Lm. The monitoring unit 22 outputs a monitor signal MON indicating the detection result to the control unit 11.

Figure 12:
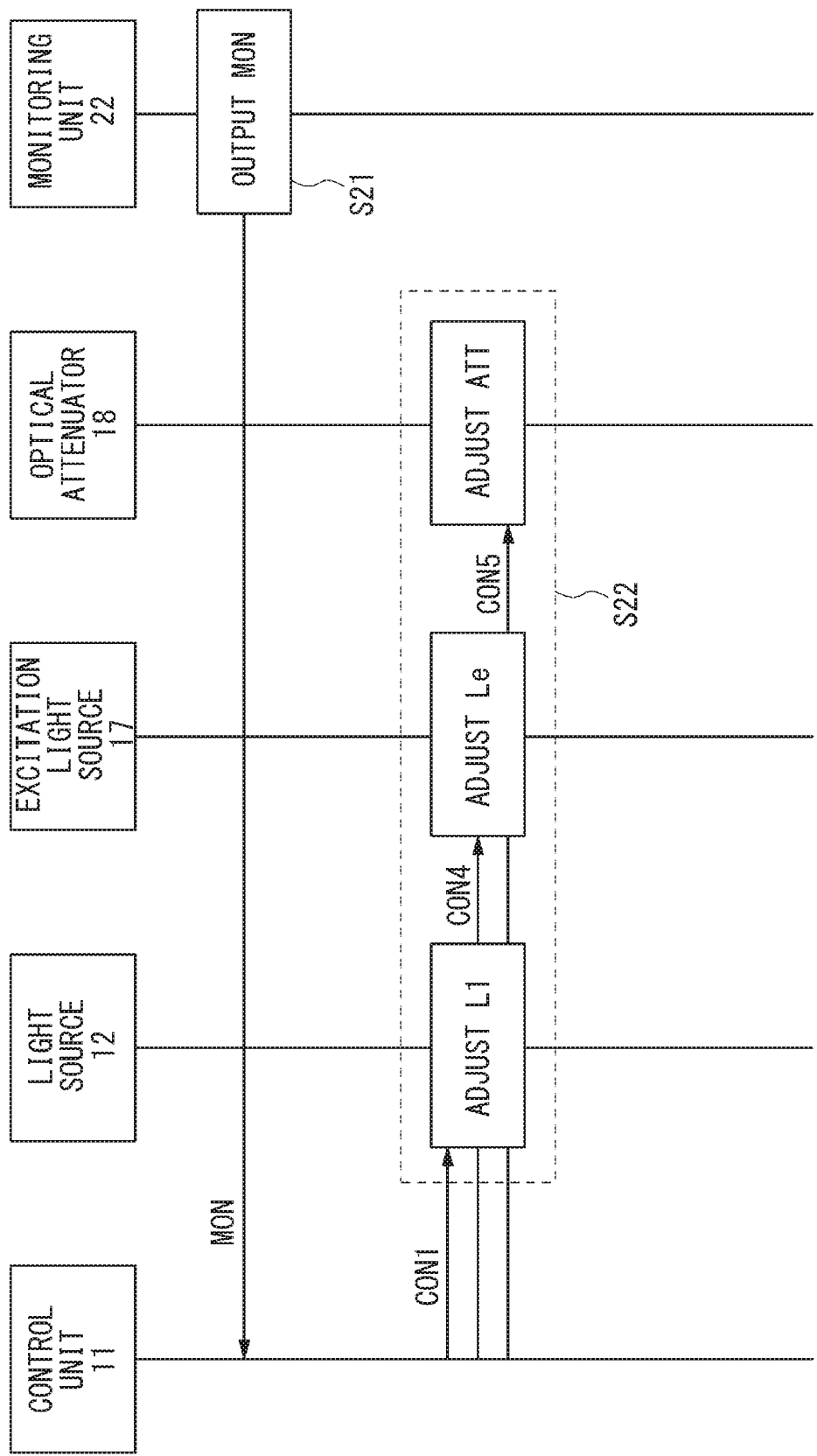
FIG. 12 is a sequence diagram illustrating a feedback control operation of an optical signal in the pluggable optical module according to the second example embodiment.

Next, a feedback control of the optical signal in the pluggable optical module 200 will be described. FIG. 12 is a sequence diagram illustrating the feedback control operation of the optical signal in the pluggable optical module 200 according to the second example embodiment.

Step S21

The monitoring unit 22 detects the light intensity (the optical power) of the optical signal LS1 based on the monitor light Lm, and outputs the monitor signal MON indicating the detection result to the control unit 11.

Step S22

The control unit 11 refers to the monitor signal MON to monitor the light intensity (the optical power) of the optical signal LS1 and performs the feedback control of a part or all of the light source 12, the excitation light source 17, and the optical attenuator 18 so that the light intensity (the optical power) of the optical signal LS1 becomes a predetermined value or falls within a predetermined range. In this case, only the part of the light source 12, the excitation light source 17, and the optical attenuator 18 may be controlled and the other of those may be driven with the predetermined value. Thus, the light intensity (the optical power) of the optical signal LS1 can be adjusted to the desired value or within the desired range.

The control unit 11 may perform the feedback control so that the light intensity (the optical power) of the optical signal LS1 becomes the predetermined value or falls within the predetermined range that are determined in advance. The predetermined value or the predetermined range that are determined in advance is stored in a memory device not illustrated in the drawings disposed in the pluggable optical module 100, and the control unit 11 may be configured to appropriately refer to the predetermined value or the predetermined range stored in the memory device. The feedback control described above may be automatically controlled by a feedback loop configured by hardware.

Although not illustrated in the drawings, the optical output (the optical power) of the excitation light source 17 may be feedback-controlled so that the amplification factor of the EDFA 16 becomes a constant value or falls within a predetermined range. The feedback control may be achieved by the control unit 11 adjusting the optical output (the optical power) of the excitation light source 17 using control signal CON4, or may be automatically controlled by the feedback loop configured by the hardware.

The predetermined value or range with respect to the optical signal LS1 may be set by providing the control signal CON including the control information indicating the predetermined value or range to the control unit 11 from the optical communication apparatus 93. The control information may be stored in the above-described memory device. In this case, the information indicating the predetermined value and range may be stored as a lookup table. FIG. 13 illustrates an example of a lookup table indicating a relation between the target value of the light intensity (optical power) of the optical signal, and setting values of the light source, the excitation light source, and the optical attenuator.

As described above, according to the present configuration, it is possible to perform the feedback control using the monitor signal MON so that the light intensity (optical power) of the optical signal LS1 becomes the desired value or falls within the desired range.

Third Example Embodiment

Next, a pluggable optical module 300 according to a third example embodiment will be described. The pluggable optical module 300 is an alternative example of the pluggable optical module 100 according to the first example embodiment. The pluggable optical module 300 is different from the pluggable optical module 100 in that the control unit 11 also controls the modulator 14.

Figure 14:
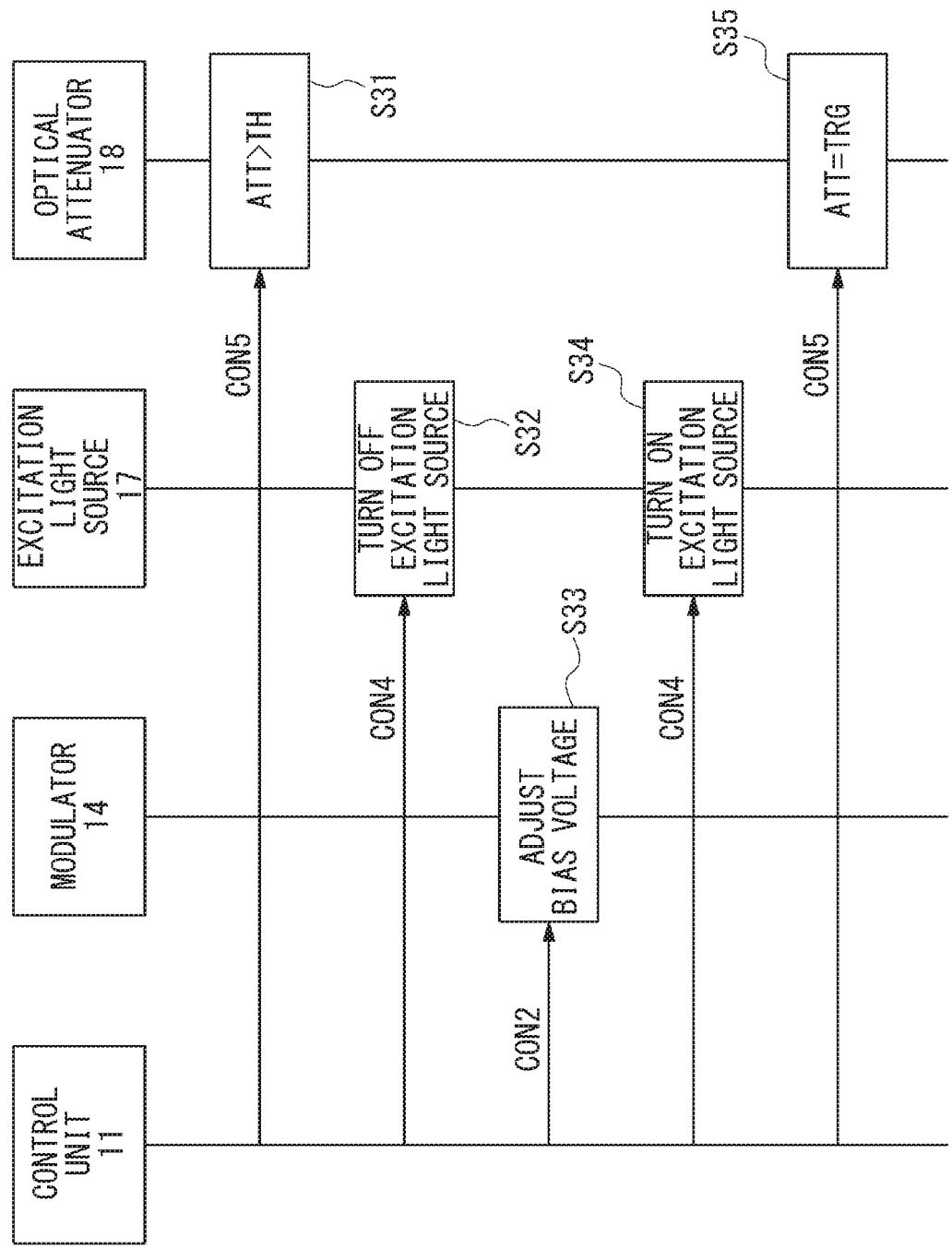
FIG. 14 is a sequence diagram illustrating a bias voltage adjustment operation of a pluggable optical module according to a third example embodiment.

The control unit 11 controls the bias voltage VBIAS using the control signal CON2 to adjust the bias point for driving the modulator 14. Because the optical output from the pluggable optical module 300 is stopped when changing the bias voltage VBIAS, it is required to prevent the excitation light Le from leaking to the optical fiber 91 as in the above-described example embodiments. The bias voltage adjustment operation will be described below. FIG. 14 is a sequence diagram illustrating the bias voltage adjustment operation of the pluggable optical module 300 according to the third example embodiment.

Step S31

The control unit 11 controls the optical attenuator 18 using the control signal CON5 so that the optical attenuation ATT becomes larger than the predetermined value TH. Thus, the optical attenuator 18 functions as the shutter blocking the excitation light Le. The control unit 11 may control the optical attenuator 18 so that the optical attenuation ATT becomes the maximum value or the enough large value.

Step S32

The control unit 11 controls the excitation light source 17 using the control signal CON4 to stop the output of the excitation light Le.

Although the step S32 is executed after the step S31 as described above, the execution order of the steps is not limited to this. The step S31 may be executed after the step S32 or the steps S31 and S32 may be executed in parallel.

Step S33

The control unit 11 controls the bias voltage VBIAS of the modulator 14 using the control signal CON2 to adjust the bias point for driving the modulator 14 to the desired value.

Step S34

The control unit 11 controls the excitation light source 17 to output the excitation light Le using the control signal CON4. Thus, the excitation light Le is output from the excitation light source 17 to the EDFA16.

Step S35

After that, the control unit 11 controls the optical attenuator 18 using the control signal CON5 so that the optical attenuation ATT becomes the value TRG appropriate for outputting the optical signal LS1.

According to the above operation, the pluggable optical module 300 can autonomously control the bias voltage of the modulator 14 while preventing the leakage of the excitation light Le.

Note that the optical communication apparatus 93 may provide the control unit 11 with the control signal CON including the bias point adjustment instruction and then the control unit 11 may adjust the bias voltage in response to the control signal CON so as to perform the control of the bias voltage. In this case, after the completion of the step S35, the control unit 11 may output the signal notifying the completion of the optical output start operation to the optical communication apparatus 93 through the pluggable electric connector 1. Thus, the optical communication apparatus 93 can confirm the completion of the bias point adjustment that is instructed to the pluggable optical module 300.

In this case, the bias point may be more accurately adjusted to the desired bias point or within the desired range by monitoring the light output from the modulator 14 and feedback controlling the bias voltage VBIAS based on the monitoring result. Note that the monitoring of the light at the modulator is not limited to the light output from the modulator. When there is an open end of the optical wave guide other than the waveguide connecting to the output at the confluence of the waveguides in the Mach-Zehnder type optical modulator, the above-described feedback operation may be performed by monitoring the light at the open end.

Fourth Example Embodiment

Figure 15:
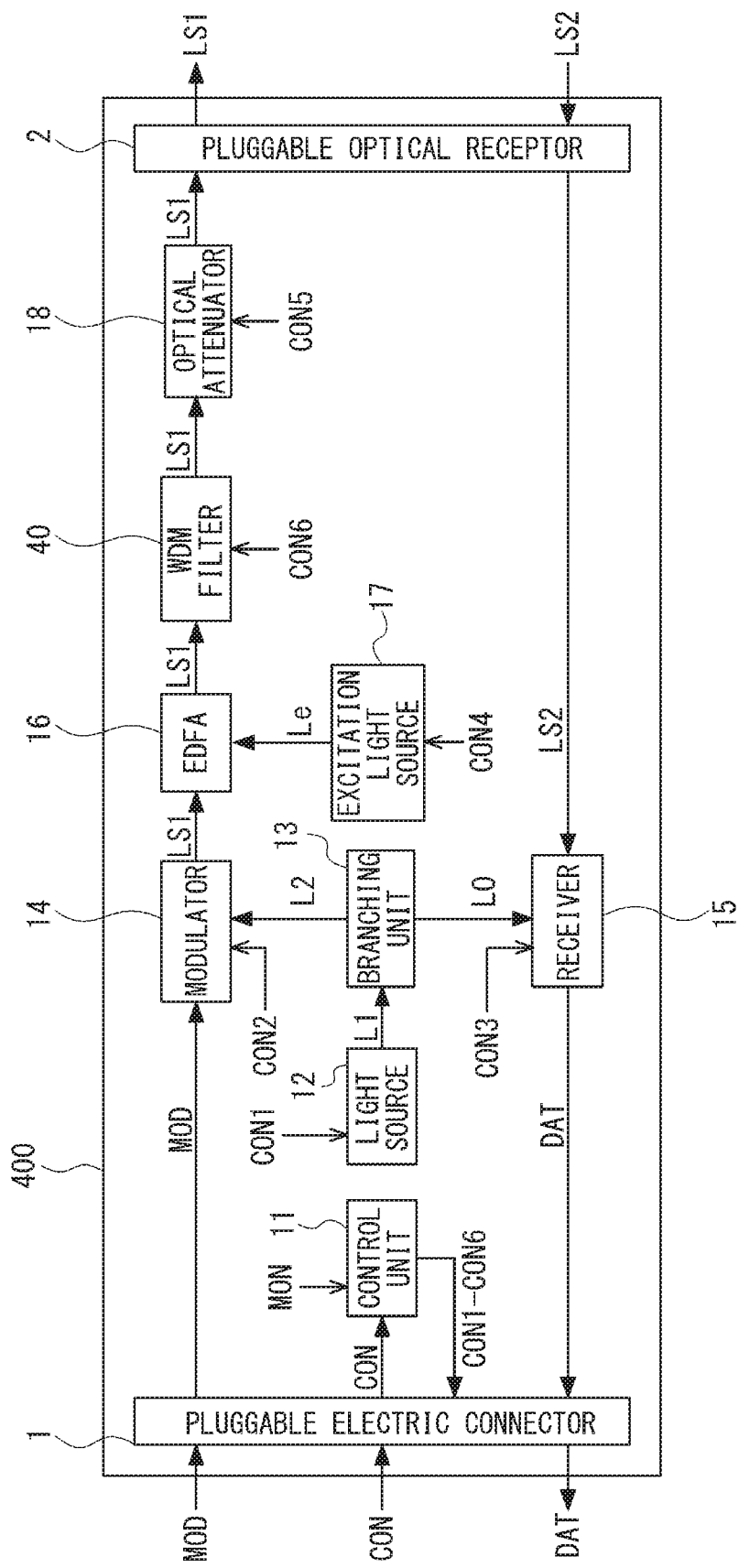
FIG. 15 is a block diagram schematically illustrating a configuration of a pluggable optical module according to a fourth example embodiment.

Next, a pluggable optical module 400 according to a fourth example embodiment will be described. The pluggable optical module 400 is an alternative example of the pluggable optical module 100 according to the first example embodiment. FIG. 15 is a block diagram schematically illustrating a configuration of the pluggable optical module 400 according to the fourth example embodiment. The pluggable optical module 400 has a configuration in which a WDM filter 40 is added to the pluggable optical module 100. Since the other configuration of the pluggable optical module 400 is the same as that of the pluggable optical module 100, description thereof will be omitted.

The WDM filter 40 is inserted between the EDFA16 and the optical attenuator 18 and filters the wavelength of the optical signal LS1. Thus, noise component due to the EDFA16 or the like is eliminated from the optical signal LS1.

Figure 16:
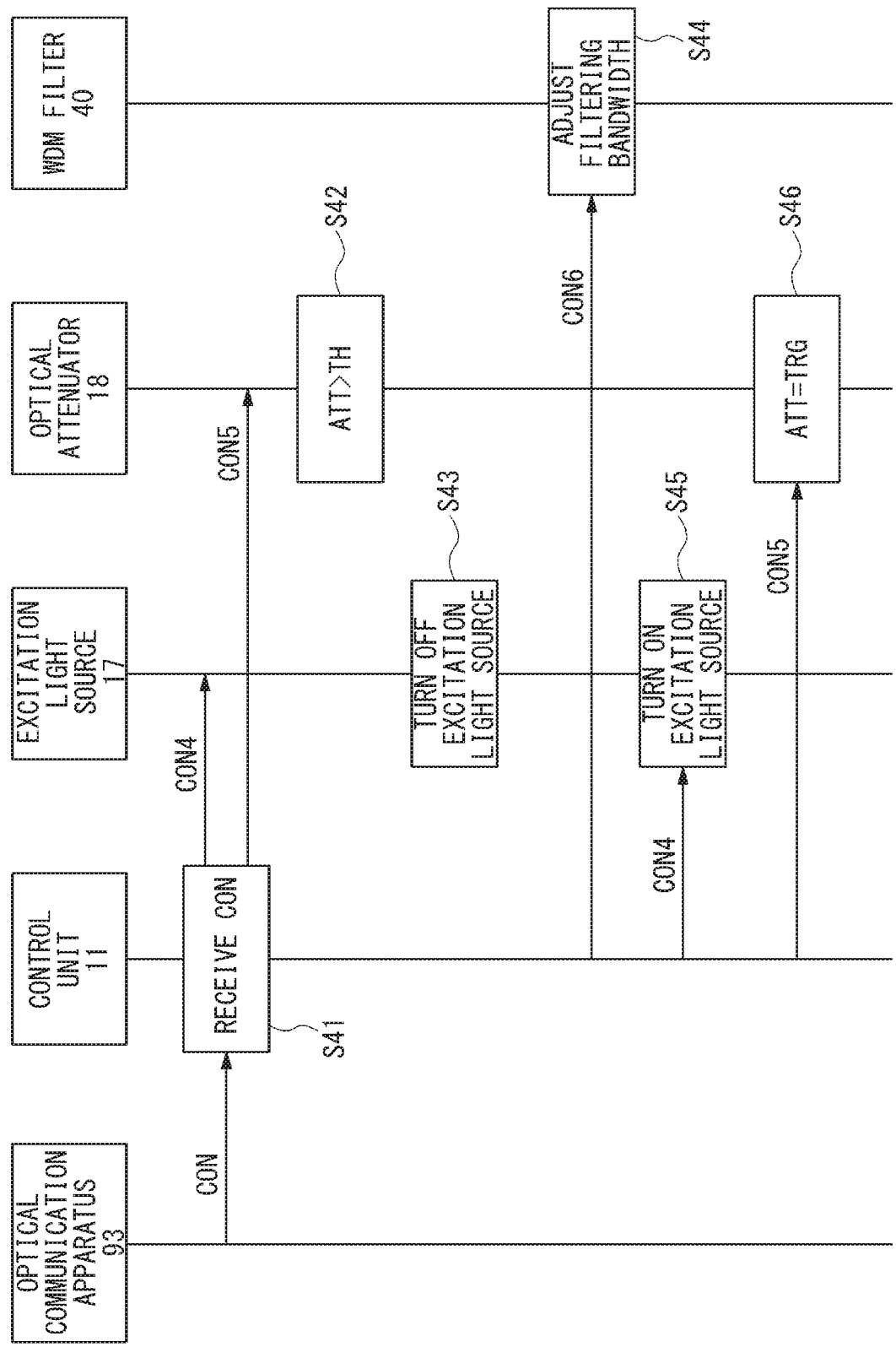
FIG. 16 is a sequence diagram illustrating a filter bandwidth control operation of the pluggable optical module according to the fourth example embodiment.

In the present example embodiment, the filter bandwidth the WDM filter 40 can be controlled by the control signal CON6 output from the control unit 11. Since the optical output from the pluggable optical module 400 is stopped when changing the filter bandwidth the WDM filter 40, it is required to prevent the excitation light Le from leaking to the optical fiber 91 as in the above-described example embodiments. A filter bandwidth change operation will be described below. FIG. 16 is a sequence diagram illustrating the filter bandwidth control operation of the pluggable optical module 400 according to the fourth example embodiment.

Step S41

The optical communication apparatus 93 outputs the control signal CON. The control unit 11 receives the control signal CON through the pluggable electric connector 1. The received control signal includes the optical output blocking instruction of the wavelength switching instruction of the optical signal.

Step S42

The control unit 11 controls the optical attenuator 18 using the control signal CON5 so that the optical attenuation ATT becomes larger than the predetermined value. Thus, the optical attenuator 18 functions as the shutter blocking the excitation light Le. The control unit 11 may control the optical attenuator 18 so that the optical attenuation ATT becomes the maximum value or the enough large value.

Step S43

The control unit 11 controls the excitation light source 17 using the control signal CON4 to stop the output of the excitation light Le.

Although the step S43 is executed after the step S42 as described above, the execution order of the steps is not limited to this. The step S42 may be executed after the step S43 or the steps S42 and S43 may be executed in parallel.
Step S44

The control unit 11 feedback-controls the WDM filter 40 using the control signal CON6 so that the filter bandwidth of the WDM filter 40 becomes a desired bandwidth. Note that the WDM filter 40 may be configured as a passive component that is not controlled by the control unit. In this case, the filter bandwidth of the WDM filter 40 is determined to become a desired range when designing it.
Step S45

The control unit 11 controls the excitation light source 17 using the control signal CON4 to output the excitation light Le. Thus, the excitation light Le is output from the excitation light source 17 to the EDFA16.
Step S46

After that, the control unit 11 controls the optical attenuator 18 using the control signal CON5 so that the optical attenuation ATT becomes the value TRG appropriate for outputting the optical signal LS1.

The control information of the filter bandwidth of the WDM filter 40 may be stored as a part of the lookup table in the memory unit as in the second example embodiment. The control information of the filter bandwidth of the WDM filter 40 may be set by providing the control unit 11 with the control signal CON including the control information of the filter bandwidth of the WDM filter 40 from the optical communication apparatus 93. In this case, after the completion of the step S46, the control unit 11 may output a signal notifying that the control operation of the filter bandwidth of the WDM filter 40 has been completed to the optical communication apparatus 93 through the pluggable electric connector 1. Thus, the optical communication apparatus 93 can confirm the completion of the control operation of the filter bandwidth that has been instructed to the pluggable optical module 400.

Fifth Example Embodiment

Figure 17:
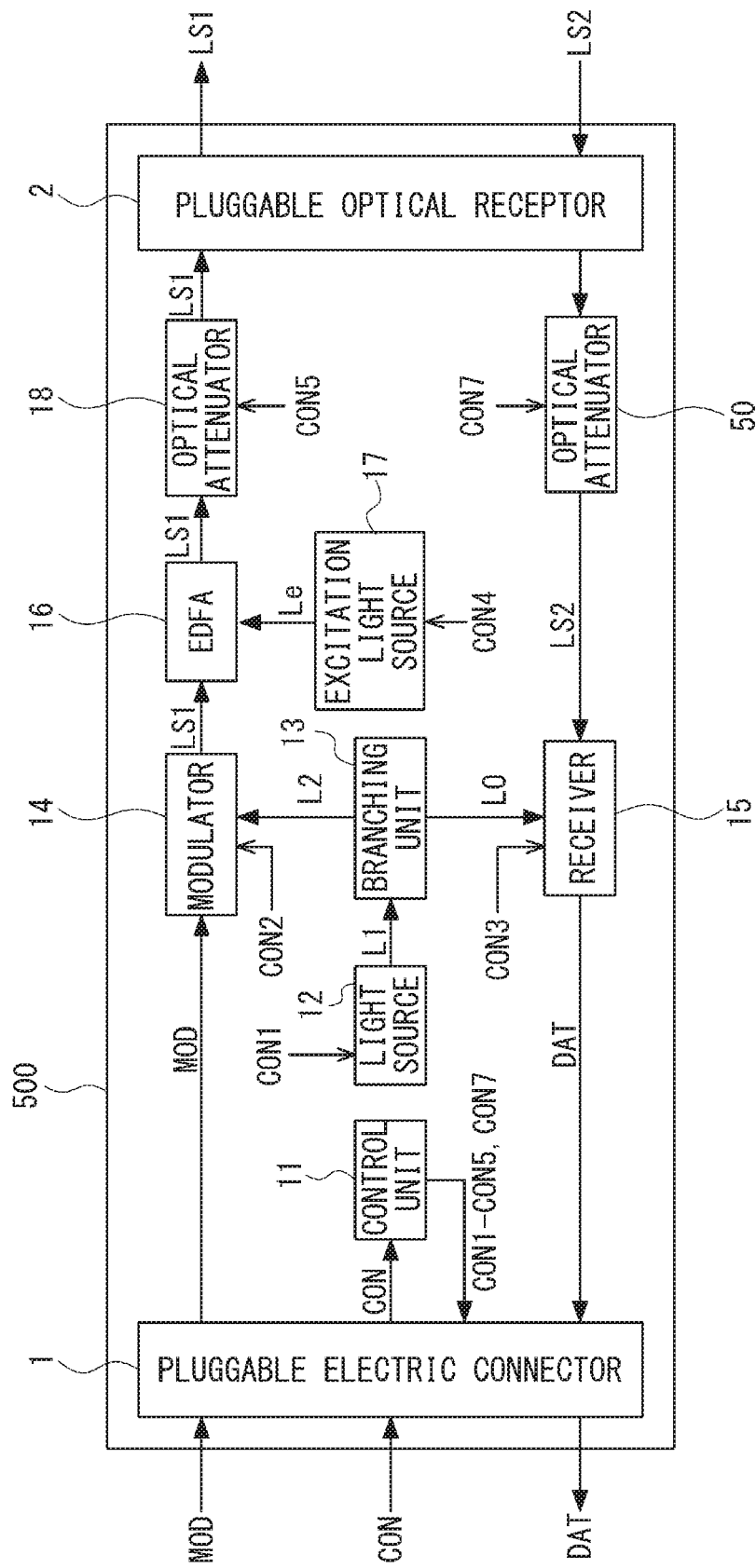
FIG. 17 is a block diagram schematically illustrating a configuration of a pluggable optical module according to a fifth example embodiment.

Next, a pluggable optical module 500 according to a fifth example embodiment will be described. The pluggable optical module 500 is an alternative example of the pluggable optical module 100 according to the first example embodiment. FIG. 17 is a block diagram schematically illustrating a configuration of the pluggable optical module 500 according to the fifth example embodiment. The pluggable optical module 500 has a configuration in which an optical attenuator 50 (also referred to as a second optical attenuator) is added to the pluggable optical module 100. Since the other configuration of the pluggable optical module 500 is the same as that of the pluggable optical module 100, description thereof will be omitted.

The pluggable optical module 500 controls the light intensity (optical power) of the light L1 output from the light source 12 as appropriate in order to control the light intensity (optical power) of the optical signal LS1
In the present configuration, since the light source 12 is shared by the transmission side and the reception side, the light intensity (optical power) of the local oscillation light LO branched from the light L1 also varies as the light intensity (optical power) of the light L1 varies. However, because it is necessary to match the light intensity (optical power) of the optical signal LS2 with the light intensity (optical power) of the local oscillation light LO for demodulating the optical signal LS2, it is necessary to appropriately adjust the light intensity (optical power) of the optical signal LS2 according to the variation of the light intensity (optical power) of the local oscillation light LO. That is, when the light intensity (light power) of the light L1 output from the light source 12 is adjusted while the light output is stopped or the wavelength switching operation is performed, it is required to further adjust the light intensity (optical power) of the optical signal LS2 as appropriate.

Therefore, an optical attenuator 50 that is a variable optical attenuator attenuating the optical signal LS2 input from the optical fiber 92 is disposed in the pluggable optical module 500 according to the present example embodiment. The attenuation of the optical attenuator 50 can be controlled by a control signal CONT output from the control unit 11. Even when the light intensity (light power) of the light L1 output from the light source 12 is adjusted, the control unit 11 further adjusts the attenuation of the optical attenuator 50, so that the light intensity (optical power) of the optical signal LS2 input to the receiver 15 can become an appropriate value or fall within an appropriate range.

Figure 18:
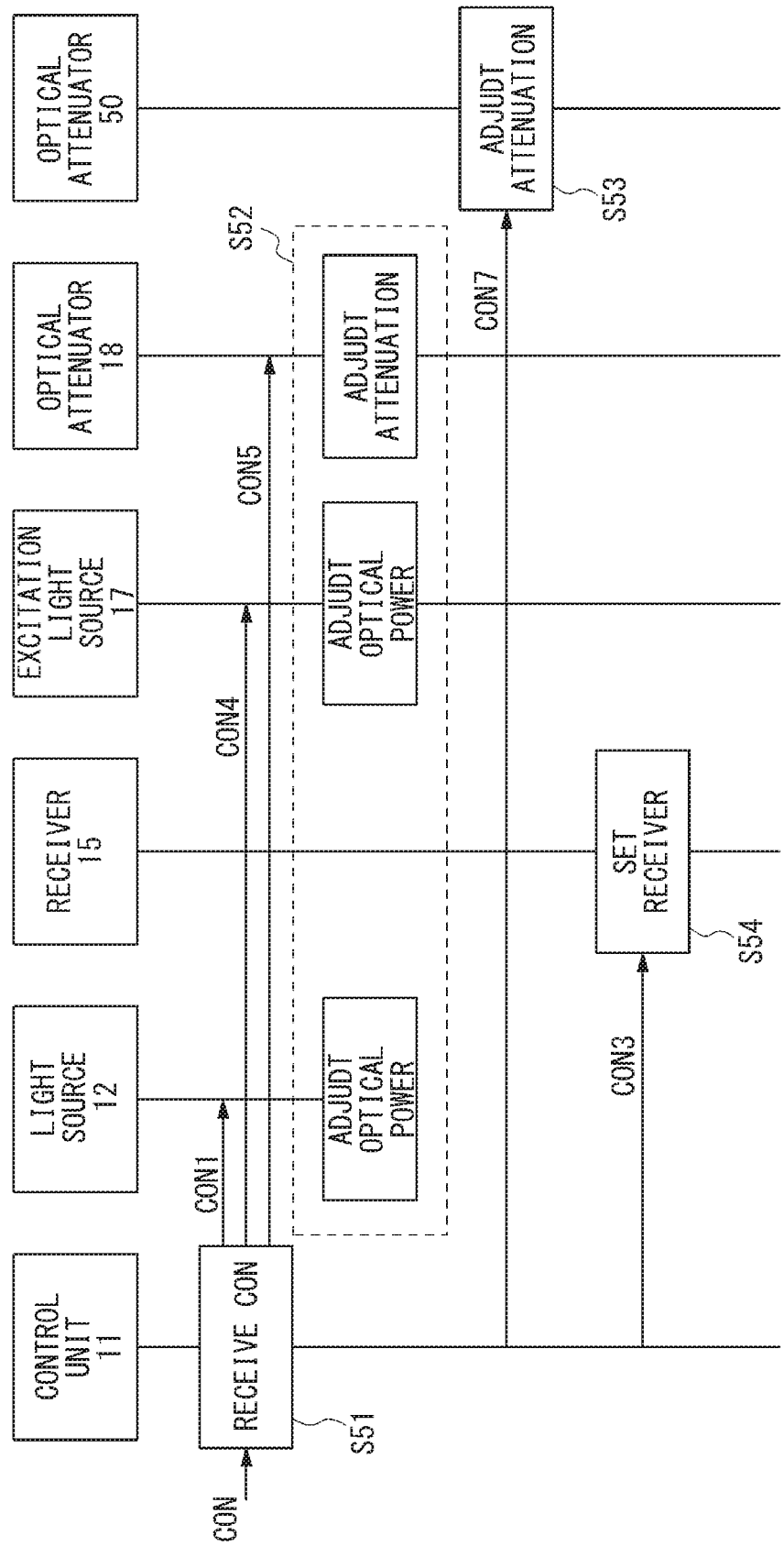
FIG. 18 is a sequence diagram illustrating an optical output blocking operation of the pluggable optical module according to the fifth example embodiment.

An operation of pluggable optical module 500 will be described below. FIG. 18 is a sequence diagram illustrating the optical output blocking operation of the pluggable optical module 500 according to the fifth example embodiment.
Step S51

The optical communication apparatus 93 outputs the control signal CON. The control unit 11 receives the control signal CON through the pluggable electric connector 1. The received control signal includes the optical output blocking instruction such as the instruction to block the output of the optical signal and the instruction to switch the wavelength of the optical signal.
Step S52

The control unit 11 appropriately controls the light source 12, the excitation light source 17, and the optical attenuator 18 in response to the control signal CON. Since the controls of the light source 12, the excitation light source 17, and the optical attenuator 18 in the step S52 is the same as those of the second example embodiment, description thereof will be omitted.
Step S53

The control unit 11 controls the attenuation of the optical attenuator 50 using the control signal CONT so that the optical signal LS2 input to the receiver 15 becomes the desired value or falls within the desired range with respect to the light intensity (optical power) of the local oscillation light LO branched by the branching unit 13 based on the adjusted light intensity (optical power) of the light L1 in according to the control information.
Step S54

The control unit 11 sets the receiver 15 according to the control information. The control unit 11 sets parameters used for digital processing such as dispersion compensation and skew compensation of the DSP included in the receiver.

According to the above operation, when receiving the blocking instruction from the optical communication apparatus 93, it is possible to prevent the excitation light Le output from the excitation light source 17 from leaking from the pluggable optical module 500.

Additionally, since it is possible to match the light intensity (optical power) of the optical signal LS2 with the light intensity (optical power) of the local oscillation light LO by adjusting the attenuation of the optical attenuator 50, it is possible to achieve appropriate reception state even when the light source 12 in the pluggable optical module 500 is adjusted.

After the completion of the step S54, the control unit 11 may output the signal notifying the completion of the optical output blocking to the optical communication apparatus 93 through the pluggable electric connector 1. Thus, the optical communication apparatus 93 can confirm the completion of the optical output blocking that is instructed to the pluggable optical module 500.

Since the optical output start operation of the present example embodiment is the same as that of the first example embodiment, description thereof will be omitted.

Other Example Embodiments

The present invention is not limited to the above-described example embodiments, and can be modified as appropriate without departing from the scope of the invention. For example, in the above-described example embodiments, an isolator may be inserted between the modulator and the EDFA to prevent a return light to the modulator.

Although it has been described that the branching unit 13 is separated from the light source 12, the modulator 14, and the receiver 15, it is merely an example. For example, the branching unit 13 may be incorporated in the light source 12. The branching unit 13 may be also incorporated in the modulator 14. In this case, the light L1 is input to the modulator 14, branched by the branching unit 13 in the modulator 14, and the branched local oscillation light LO is input to the receiver 15. Further, the branching unit 13 may be also incorporated in the receiver 15. In this case, the light L1 is input to the receiver 15, branched by the branching unit 13 in the receiver 15, and the branched light L2 is input to the modulator 14.

In the above-described example embodiments, the example in which the control unit 11 controls the light source, the optical modulator, the receiver, the excitation light source, and the optical attenuator based on the control signal CON from the optical communication apparatus 93 has been described. However, the control unit 11 may autonomously control the light source, the optical modulator, the receiver, the excitation light source, and the optical attenuator regardless of the control signal from the outside.

In the above-described example embodiments, the communication of the control signal through the pluggable electric connector 1 can be achieved by applying technologies such as MDIO (Management Data Input/Output) or an I2C (Inter-Integrated Circuit).

In the above-described example embodiments, although it is described that the receiver 15 receives the DP-QPSK optical signal, it is merely an example. For example, the receiver 15 may be configured to be capable of receiving other modulation signal such as QAM (Quadrature Amplitude Modulation).

In the above-described example embodiments, although it has been described that the light source 12 includes the semiconductor optical amplifier and the wavelength filter, other configurations can be adopted as long as these can function as a wavelength-tunable light source. For example, the light source 12 may include a DFB (Distributed Feed-Back) laser array and a selection unit that selects a laser lights among laser lights output from a plurality of DFB lasers included in the DFB laser array. Further, instead of the DFB (Distributed FeedBack) laser array, a laser array including another type of laser such as a DBR (Distributed Bragg Reflector) laser may be used.

It should be appreciated that the pluggable optical module that is a combination of the second to fourth example embodiments can be configured. For example, It should be appreciated that a part or all of the configuration for monitoring the monitor signal and feedback-controlling the optical power of the optical signal (the second example embodiment), the configuration for adjusting the bias voltage (the third example embodiment), the configuration for disposing the WDM filter and adjusting the filter bandwidth (the fourth example embodiment), and the configuration for adjusting the optical power of the reception side optical signal so as to match the local oscillation light LO (the fifth example embodiment) may be combined to configure the pluggable optical module.

In the drawings refereed in the above-described example embodiments, the transmission of the signal between the components in the pluggable optical module and between the components disposed in the optical communication system (the pluggable optical module and the optical communication apparatus) is indicated with the allow line. However, this indication does not mean that the signal is transmitted in a single direction between two components. It should be appreciated that the signal can be bi-directionally communicated between the two components as appropriate.

The pluggable optical module described in the above example embodiments can be also achieved by the control unit or the CPU (Central Processing Unit) included in the control unit to execute a computer program.

The program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (Read Only Memory), CD-R, CD-R/W, and semiconductor memories (such as mask ROM, PROM (Programmable ROM), EPROM (Erasable PROM), flash ROM, RAM (Random Access Memory), etc.). The program may be provided to a computer using any type of transitory computer readable media. Examples of transitory computer readable media include electric signals, optical signals, and electromagnetic waves. Transitory computer readable media can provide the program to a computer via a wired communication line, such as electric wires and optical fibers, or a wireless communication line.

The present invention has been described above with reference to the example embodiments, but the present invention is not limited to the above example embodiments. The configuration and details of the present invention can be modified in various ways which can be understood by those skilled in the art within the scope of the invention.

This application is based upon and claims the benefit of priority from Japanese patent application No. 2017-138042, filed on Jul. 14, 2017, the disclosure of which is incorporated herein in its entirety by reference.

REFERENCE SIGNS LIST

1 PLUGGABLE ELECTRIC CONNECTOR
2 PLUGGABLE OPTICAL RECEPTOR
11 CONTROL UNIT
11A CENTRAL PROCESSING UNIT (CPU)
11B NON-VOLATILE MEMORY (NVM)
11C RANDOM ACCESS MEMORY (RAM)
11D INPUT/OUTPUT PORT (I/O)
11E INTERNAL BUS
12 LIGHT SOURCE
13 BRANCHING UNIT
14 MODULATOR

14A DRIVER CIRCUIT
15 RECEIVER
16 EDFA
17 EXCITATION LIGHT SOURCE
18 OPTICAL ATTENUATOR
21 BRANCHING UNIT
22 MONITORING UNIT
31, 32 POLARIZATION BEAM SPLITTERS (PBSs)
33, 34 90-DEGREE HYBRIDS
35 DIGITAL SIGNAL PROCESSOR (DSP)
40 WDM FILTER
41 TO 44 OPTICAL/ELECTRICAL CONVERTERS (O/Es)
50 OPTICAL ATTENUATOR
51 TO 54 ANALOG TO DIGITAL CONVERTERS (ADCs)
91, 92 OPTICAL FIBERS
93 OPTICAL COMMUNICATION APPARATUS
94 SUBSTRATE
95 SLOT
94A INTERFACE UNIT (I/F)
94B CONTROL UNIT
94C TRANSMISSION UNIT
94D RECEPTION UNIT
95 SLOT
100, 200, 300, 400, 500 PLUGGABLE OPTICAL MODULES
1000 OPTICAL COMMUNICATION SYSTEM
CON, CON1-CON7 CONTROL SIGNALS
DAT DATA SIGNAL
L1, L2 LIGHTS
Le EXCITATION LIGHT
Lm MONITOR LIGHT
LO LOCAL OSCILLATION LIGHT
LS1, LS2 OPTICAL SIGNALS
MOD MODULATION SIGNAL
MON MONITOR SIGNAL
PMA, PMB PHASE MODULATION AREAS
SIG_M1, SIG_M2 MODULATION SIGNALS
VBIAS BIAS VOLTAGE
WG1 TO WG4 OPTICAL WAVEGUIDES

The invention claimed is:

1. A pluggable optical module capable of being inserted into and removed from an optical communication apparatus, the pluggable optical module comprising:
a light source configured to output a light;
a first branching unit configured to branch the light output from the light source into a first branched light and a second branched light;
a modulator configured to modulate the first branched light to output a first optical signal;
a receiver configured to cause the second branched light to interfere with a second optical signal to receive the second optical signal;
a fiber type optical amplifier configured to amplify the first optical signal output from the modulator;
an excitation light source configured to output an excitation light exciting the fiber type optical amplifier to the fiber type optical amplifier;
a first optical attenuator configured to attenuate optical power of the first optical signal amplified by the fiber type optical amplifier; and
a control unit configured to control attenuation of the first optical signal in the first optical attenuator, wherein
the control unit adjusts the attenuation of the first optical signal and adjusts an output of the excitation light from the excitation light source.

2. The pluggable optical module according to claim 1, wherein the control unit prevents the excitation light from leaking from the pluggable optical module by adjusting the attenuation of the first optical signal and adjusting the output of the excitation light from the excitation light source.

3. The pluggable optical module according to claim 1, wherein the control unit causes the attenuation of the first optical signal to become lager than a predetermined value and stops the output of the excitation light from the excitation light source.

4. The pluggable optical module according to claim 1, wherein the control unit adjusts the attenuation of the first optical signal and adjusts the output of the excitation light from the excitation light source in response to a control signal from the optical communication apparatus.

5. The pluggable optical module according to claim 1, further comprising:
a second branching unit configured to branch a part of the first optical signal attenuated by the first optical attenuator as a monitor light; and
a monitoring unit configured to output a monitor signal based on the monitor light to the control unit, wherein
the control unit monitors the optical power of the first optical signal output from the second branching unit based on the monitor signal and feedback-controls a part or all of the light source, the excitation light source, and the first optical attenuator so that the optical power of the first optical signal falls within a predetermined range.

6. The pluggable optical module according to claim 1, wherein
the modulator comprises a Mach-Zehnder type optical modulator,
the control unit adjusts a bias voltage applied to a phase modulation area disposed on a waveguide in the Mach-Zehnder type optical modulator after adjusting the attenuation of the first optical signal.

7. The pluggable optical module according to claim 1, wherein
the control unit monitors a light output from the modulator and feedback-controls the bias voltage so that optical power of the monitored light falls within a predetermined range.

8. The pluggable optical module according to claim 1, further comprising a bandpass filter configured to filter the first optical signal output from the fiber type optical amplifier.

9. The pluggable optical module according to claim 8, wherein
the control unit adjusts a bandwidth filtered by the bandpass filter according to a wavelength of the light output from the light source after adjusting the attenuation of the first optical signal.

10. The pluggable optical module according to claim 1, further comprising a second optical attenuator configured to attenuate the second optical signal and to output the attenuated second optical signal to the receiver, wherein
the control unit adjusts attenuation of the second optical signal in the second optical attenuator based on optical power of the light output from the light source.

11. An optical communication system comprising:
an optical communication apparatus; and
a pluggable optical module configured to be capable of being inserted into and removed from the optical communication apparatus, wherein
the pluggable optical module comprises:
a light source configured to output a light;

a first branching unit configured to branch the light output from the light source into a first branched light and a second branched light;

a modulator configured to modulate the first branched light to output a first optical signal;

a receiver configured to cause the second branched light to interfere with a second optical signal to receive the second optical signal;

a fiber type optical amplifier configured to amplify the first optical signal output from the modulator;

an excitation light source configured to output an excitation light exciting the fiber type optical amplifier to the fiber type optical amplifier;

a first optical attenuator configured to attenuate optical power of the first optical signal amplified by the fiber type optical amplifier; and a control unit configured to control attenuation of the first optical signal in the first optical attenuator, wherein the control unit adjusts the attenuation of the first optical signal.

12. The optical communication system according to claim 11, wherein the control unit prevents the excitation light from leaking from the pluggable optical module by adjusting the attenuation of the first optical signal and adjusting the output of the excitation light from the excitation light source.

13. The optical communication system according to claim 11, wherein the control unit causes the attenuation of the first optical signal to become lager than a predetermined value and stops the output of the excitation light from the excitation light source.

14. The optical communication system according to claim 11, wherein the control unit adjusts the attenuation of the first optical signal and adjusts the output of the excitation light from the excitation light source in response to a control signal from the optical communication apparatus.

15. The optical communication system according to claim 11, further comprising:

a second branching unit configured to branch a part of the first optical signal attenuated by the first optical attenuator as a monitor light; and a monitoring unit configured to output a monitor signal based on the monitor light to the control unit, wherein the control unit monitors the optical power of the first optical signal output from the second branching unit based on the monitor signal and feedback-controls a part or all of the light source, the excitation light source, and the first optical attenuator so that the optical power of the first optical signal falls within a predetermined range.

16. The optical communication system according to claim 11, wherein the modulator comprises a Mach-Zehnder type optical modulator, the control unit adjusts a bias voltage applied to a phase modulation area disposed on a waveguide in the Mach-Zehnder type optical modulator after adjusting the attenuation of the first optical signal.

17. The optical communication system according to claim 11, wherein the control unit monitors a light output from the modulator and feedback-controls the bias voltage so that optical power of the monitored light falls within a predetermined range.

18. The optical communication system according to claim 11, further comprising a bandpass filter configured to filter the first optical signal output from the fiber type optical amplifier.

19. The optical communication system according to claim 18, wherein the control unit adjusts a bandwidth filtered by the bandpass filter according to a wavelength of the light output from the light source after adjusting the attenuation of the first optical signal.

20. A control method of a pluggable optical module, the pluggable optical module capable of being inserted into and removed from an optical communication apparatus, the pluggable optical module comprising: a light source configured to output a light; a first branching unit configured to branch the light output from the light source into a first branched light and a second branched light; a modulator configured to modulate the first branched light to output a first optical signal; a receiver configured to cause the second branched light to interfere with a second optical signal to receive the second optical signal; a fiber type optical amplifier configured to amplify the first optical signal output from the modulator; an excitation light source configured to output an excitation light exciting the fiber type optical amplifier to the fiber type optical amplifier; a first optical attenuator configured to attenuate optical power of the first optical signal amplified by the fiber type optical amplifier; and a control unit configured to control attenuation of the first optical signal in the first optical attenuator, the control method comprising: causing the control unit to adjust the attenuation of the first optical signal and adjusts an output of the excitation light from the excitation light source.

* * * * *